(12) United States Patent
Siddaramappa et al.

(10) Patent No.: US 7,735,068 B2
(45) Date of Patent: Jun. 8, 2010

(54) AUTOMATED RELATIONSHIP TRACEABILITY BETWEEN SOFTWARE DESIGN ARTIFACTS

(75) Inventors: Nagaraja Nanjegowda Siddaramappa, Bangalore (IN); Salil Agrawal, Lucknow (IN); Rajesh Balakrishnan, Bangalore (IN); Krishnakumar Poolooth, Bangalore (IN); Srinivas Thonse, Bangalore (IN)

(73) Assignee: Infosys Technologies Ltd., Bangalore (IN)

( * ) Notice: Subject to any disclaimer, the term of this patent is extended or adjusted under 35 U.S.C. 154(b) by 1223 days.

(21) Appl. No.: 11/292,895

(22) Filed: Dec. 1, 2005

(65) Prior Publication Data

US 2007/0130561 A1      Jun. 7, 2007

(51) Int. Cl.
| | |
|---|---|
| G06F 9/45 | (2006.01) |
| G06F 9/44 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 17/30 | (2006.01) |

(52) U.S. Cl. .................. 717/128; 717/106; 717/144; 717/102; 717/140; 717/101; 715/230; 715/231; 715/232; 715/233; 707/3; 707/5; 707/9

(58) Field of Classification Search .................. 717/106, 717/144, 127, 28, 102, 208, 209, 140, 101, 717/128; 715/230–233; 707/9, 3, 5; 714/38
See application file for complete search history.

(56) References Cited

U.S. PATENT DOCUMENTS

| | | | |
|---|---|---|---|
| 5,143,627 | A | 9/1992 | Lapidus et al. |
| 5,364,597 | A | 11/1994 | Polk, Jr. et al. |
| 5,500,800 | A | 3/1996 | Talbott |
| 5,652,835 | A | 7/1997 | Miller |

(Continued)

OTHER PUBLICATIONS

Dasgupta et al, "Variable Latent Semantic Indexing", 2005, ACM, pp. 13-21.*
Chen et al, "A Differential LSI Method for Document Classification", 2005, ACM, pp. 25-32.*
Sandler, "On the Use of Linear Programming for Unsupervised Text Classification", Aug. 2005, ACM, pp. 256-264.*

(Continued)

*Primary Examiner*—Wei Y Zhen
*Assistant Examiner*—Charles Swift
(74) *Attorney, Agent, or Firm*—Klarquist Sparkman, LLP

(57) ABSTRACT

Tools and methods are described herein that allows for measuring and using the relationship between artifacts of a software design, such as requirements, test plans, and so on. The relationship can be quantified by determining a relationship quotient for quantifying a similarity between components of software design artifacts and presenting the quantified relationships to a user, such as a software designer, so that he or she can account for the relationship between such components during design changes and so on. The relationship quotient is made more representative of substantive similarity by selecting the key terms that are to be submitted to a similarity analysis such that words that are too common in the English language, such as conjunctions, articles, etc., are not used. Ubiquity of certain key terms in an enterprise is accounted for by adding a term significance weight to the similarity analysis. The similarity analysis is made contextual, for instance, by the use of inputs from domain ontology including Entity Descriptions, and Entity Relationships.

18 Claims, 18 Drawing Sheets

U.S. PATENT DOCUMENTS

| | | | |
|---|---|---|---|
| 5,754,760 A * | 5/1998 | Warfield | 714/38 |
| 5,772,818 A | 6/1998 | Polk, Jr. et al. | |
| 5,949,999 A * | 9/1999 | Song et al. | 717/127 |
| 6,318,190 B1 | 11/2001 | Radcliffe et al. | |
| 6,415,396 B1 | 7/2002 | Singh et al. | |
| 6,572,824 B1 | 6/2003 | Ostgaard et al. | |
| 7,293,254 B2 * | 11/2007 | Bloesch et al. | 717/108 |
| 2001/0052089 A1 * | 12/2001 | Gustavsson et al. | 714/38 |
| 2003/0145282 A1 * | 7/2003 | Thomas et al. | 715/513 |
| 2003/0154071 A1 * | 8/2003 | Shreve | 704/9 |
| 2004/0015819 A1 * | 1/2004 | Romano-Critchley et al. | 717/102 |
| 2004/0054985 A1 * | 3/2004 | Sewell | 717/109 |
| 2004/0088677 A1 | 5/2004 | Williams | |
| 2004/0128292 A1 * | 7/2004 | Kinnell | 707/9 |
| 2005/0097092 A1 * | 5/2005 | Annau et al. | 707/3 |
| 2005/0166094 A1 * | 7/2005 | Blackwell et al. | 714/38 |
| 2005/0172261 A1 * | 8/2005 | Yuknewicz et al. | 717/106 |
| 2005/0262489 A1 * | 11/2005 | Streeter et al. | 717/144 |
| 2005/0289524 A1 * | 12/2005 | McGinnes | 717/140 |
| 2006/0005247 A1 * | 1/2006 | Zhang et al. | 726/26 |
| 2007/0112761 A1 * | 5/2007 | Xu et al. | 707/5 |

OTHER PUBLICATIONS

Gotel et al., "An Analysis of the Requirements Traceability Problem," Proceedings of the IEEE International Conference on Requirements Engineering (ICRE '94), Colorado Springs, Colorado & Taipei, Taiwan, Apr. 1994, 8 pages.*

Marcus et al., "Recovering Documentation-to-Source-Code Traceability Links using Latent Semantic Indexing," 11 pages, International Conference on Software Engineering Proceedings of the 25th International Conference on Software Engineering, Portland, Oregon, 2003.*

Yu et al, "Multi-Label Informed Latent Semantic Indexing", Aug. 2005, ACM, pp. 258-265.*

Choi, "Advances in domain independent linear text segmentation," Proceedings of the first conference on North American chapter of the Association for Computational Linguistics, 2000, 8 pages.*

International Council On Systems Engineering (INCOSE) requirements management tools survey, http://www.incose.org/ProductsPubs/products/SEtools/tooltax.html, Sep. 22, 2004, 6 pages.

Goldin et al., "AbstFinder, A Prototype Natural Language Text Abstraction Finder for Use in Requirements Elicitation," Automated Software Engineering, 4:4, 375-412, Oct. 1997, 38 pages.

Porter, Porter Stemming Algorithm, http://tartarus.org/~martin/PorterStemmer/, archived Nov. 26, 2004, 4 pages.

Church, et al., "Inverse Document Frequency (IDF): A Measure of Deviations from Poisson," Proceedings of the 3rd Workshop on Very Large Corpora, Massachusetts Institute of Technology, Cambridge, MA. 1995, 10 pages.

"JTidy—Jtidy how to," http://jtidy.sourceforge.net/howto.html, archived October 2005, 2 pages.

Prasad et al., The Penn Discourse TreeBank as a Resource for Natural Language Generation (slides), Workshop on Using Corpora for NLG, Jul. 14, 2005, 26 pages.

Prasad et al., The Penn Discourse TreeBank as a Resource for Natural Language Generation, Workshop on Using Corpora for NLG, Jul. 14, 2005, 8 pages.

* cited by examiner

| USECASE / CLASS | Class 9 | Class 10 | Class 11 | Class 12 | Class 13 | Class 14 | Class 15 | Class 16 |
|---|---|---|---|---|---|---|---|---|
| Use case 1: | 0.356 | 0.489 | 0.321 | 0.275 | 0.321 | 0.249 | 0.249 | 0.210 |
| Use case 2: | 0.382 | 0.000 | 0.370 | 0.324 | 0.370 | 0.250 | 0.249 | 0.212 |
| Use case 3: | 0.364 | 0.000 | 0.343 | 0.297 | 0.343 | 0.249 | 0.249 | 0.210 |
| Use case 4: | 0.323 | 0.000 | 0.414 | 0.368 | 0.414 | 0.250 | 0.249 | 0.211 |
| Use case 5: | 0.361 | 0.000 | 0.267 | 0.221 | 0.267 | 0.249 | 0.249 | 0.211 |
| Use case 6: | 0.000 | 0.376 | 0.267 | 0.221 | 0.267 | 0.249 | 0.249 | 0.210 |
| Use case 7: | 0.331 | 0.000 | 0.865 | 0.791 | 0.865 | 0.250 | 0.249 | 0.211 |
| Use case 8: | 0.342 | 0.000 | 0.580 | 0.507 | 0.580 | 0.250 | 0.249 | 0.212 |
| Use case 9: | 0.505 | 0.000 | 0.290 | 0.242 | 0.290 | 1.000 | 0.249 | 0.901 |
| Use case 10: | 0.331 | 0.000 | 0.266 | 0.221 | 0.266 | 0.923 | 0.249 | 0.835 |
| Use case 11: | 0.331 | 0.000 | 0.267 | 0.221 | 0.267 | 0.803 | 0.249 | 0.720 |
| Use case 12: | 0.352 | 0.000 | 0.433 | 0.365 | 0.433 | 0.624 | 0.249 | 0.541 |
| Use case 13: | 0.000 | 0.000 | 0.267 | 0.221 | 0.267 | 0.249 | 0.249 | 0.211 |

| | A | B | C | D |
|---|---|---|---|---|
| 1 | Use Case Vs Class Specs | | | |
| 3 | | High match | Medium match | Low match |
| 13 | Use case 10: Get Spot | Class 15: Spot Sale Controller | | Class 7. Posted Prices Controller |
| 14 | Use Case 11: Execute | Class 15. Spot Sale Controller | Class 15. SpotSale | Class 6. Display Class 8. Display Combo |
| 15 | Use case 12: Get deal history | | Class 15. Spot Sale Controller | Class 16. SpotSale, Class 22, Class 21, CSVCOM, Class 11 |

| UC Vs CS TRACE MATRIX | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| USE CASE/ CLASS SPECIFICATION | Applic | Applic | Exceç | CostP | TermS | Displa | Poste | Displa | Locati | CostP | Quote | QuoteQuote | Quote | Price | SpotS | SpotS | Cach | Nami | DealS | UserS | CSVC | CSVR |
| Use case 1: | | | | | | | | | | | | | | | | | | | | | | PR |
| Use case 2: | | | | | | | | | | | | | | | | | | PR | | | | |
| Use case 3: | | | | | | | | | | | | | | | | | | | | | | |
| Use case 4: | | | | C | | | C | | | | | | | | | | | | | | | |
| Use case 5: | | | | C | | | | | | | | | | | | | | | | | C | |
| Use case 6: | | | | | | | | | | C | | | | | | | | | | | | |
| Use case 7: | | | | | | | PR | | | | | | | | | | | | | | | |
| Use case 8: | | | | | | | M | | | | | | | | | | | | | | | |
| Use case 9: | | | | | | | | | | | PR | M | PR | C | C M | PR C | | | | | | |
| Use case 10: | | | | | | | | | | | PR | PR | C | | C M | PR | | | | | | |
| Use case 11: | | | | | | | | | | | | | | | | | | | | | | |
| Use case 12: | | | | | | | | | M | | | | | | | | | | | | | |
| Use case 13: | | | | | | | | | | | C | PR | PR | | C | C | | PR | | | | |
| Use case 14: | | | | | | | | | | | | | | | | | | | | | | |
| Use case 15: | | | | | | | | | | | | | | | | | | | | | | |
| Use case 16: | | | | | | | | | | | | | | | | | | | | | | |
| Use case 17: | | | | | | | | | | | | | | | | | | | | | | |
| Use case 18: | | | | | | | | | | | | | | | | | | | M | | | |
| Use case 20: | | | | | | | | | | | | | | | | | | | | M | | |
| Use case 21: | | | | | | | | | | | | | | | | | | | | M | M | |
| Use case 27: | | | | | | | | | | | | | | | | | | | | | | |
| Use case 28: | | | | | | | | | | | | | | | | | | | | | | |
| LEGENDS | HIGH | | | | | | | | | | | | | | | | | | | | | |
| | MEDIUM | | | | | | | | | | | | | | | | | | | | | |
| | LOW | | | | | | | | | | | | | | | | | | | | | |
| | C | COMPUTED LINKS | | | | | | | | | | | | | | | | | | | | |
| | M | MANUAL LINKS | | | | | | | | | | | | | | | | | | | | |
| | PR | IN-PROCESS LINKS | | | | | | | | | | | | | | | | | | | | |

FIG. 16

AUTOMATED RELATIONSHIP TRACEABILITY BETWEEN SOFTWARE DESIGN ARTIFACTS

TECHNICAL FIELD

The technical field relates to tracing relationships between software artifacts. More particularly, the field relates to correlating artifacts such as, software design artifacts to determine a relationship.

BACKGROUND

During the lifecycle of large software projects several software design artifacts, such as, but not limited to, requirements specifications, test plans, use-case documents and class descriptions of object-oriented programming languages are generated. Any change in one such artifact could necessitate a change in many of the other software design artifacts as well. The ability to assess the impact of a change, in any one of the software design artifacts, on the rest of the project artifacts is a critical aspect of software engineering. However, as software design artifacts are created and updated their relationship to other artifacts is not always fixed and also not always apparent without the use of some sorts of explicit links established manually by the developers.

Maintaining user-specified explicit links between software design artifacts has many costs. For instance, such methods add substantial overhead in terms of computing resources needed to maintain the links throughout the software development lifecycle. In addition to the computing resources such methods require personnel, such as developers, business analysts, architects and other stake holders to spend valuable time to maintain the manual links.

Establishing and maintaining explicit links between related software design artifacts throughout the software development cycle also means that such relationships have to be continuously established and maintained through the software development lifecycle. Any gaps in such an effort will mean that certain relationships may be missed. Also, these methods do not lend themselves easily to ascertaining the relationships between software design artifacts in advanced stages of the software development lifecycle when a large number of such artifacts are already in place.

Thus, there is a need for automating the process of determining and quantifying relationships between various software design artifacts generated during the software development lifecycle.

SUMMARY

Described herein are methods and tools for determining traceability information between concepts of different software design artifacts. In one aspect, the concepts are components of software design artifacts that capture aspects of a design of a software application, such as a requirements specification, a test plan, an object-oriented class framework specification, and use-case documentation. Concepts can be, for example, such software design details as individual class descriptions, individual classes, and individual test cases.

In one aspect, an automated tool parses software artifacts to extract individual concepts and key terms comprised therein. In other aspects, the concepts are compared to each other to quantify a similarity between them based on their key terms. In some other aspects, key terms are selected to be included in the similarity analysis by, for instance, removing certain words and phrases from the similarity analysis because they are too common in the English language and, hence, unhelpful in determining substantive similarity between concepts being compared.

The similarity analysis can be based on frequency of selected key terms and in another aspect, the value of the term frequency can be weighted by a term significance factor, such as the Inverse Document Frequency (IDF). The IDF, among other things, desirably accentuates or attenuates the importance of selected key terms in a similarity analysis based on their ubiquity within a selected domain of an enterprise.

In yet another aspect, similarity of key terms is not based on syntactical similarity but it also based semantic meanings of the key terms which are determined based at least in part on domain ontology including Entity description and Entity relationships, for instance.

In further aspects, the tools described herein are capable of implementing an impact analysis for quantifying the impact that changes in one concept may have on another concept based on their quantified relationship. Also, the relationship quantifier can be used by the tools described herein to provide a summary report of the various relationships between concepts such that a software designer can be made aware of the various relationships at a higher summary level and can then account for such relationships when designing the software.

In yet another aspect, key terms associated with a set of test cases comprised therein can be identified and compared with key terms of a set of requirements to establish a minimal sub-set of the entire set of test cases needed to cover the requirements. In one aspect, the method for establishing a minimal sub-set of test cases begins with maintaining a data structure with key terms associated with the set of requirements and another data structure having a list of the test cases that have key terms in common with the key terms of the requirements. The maintaining of the data structure, in this example, begins with iteratively updating the key term data structure by removing those key terms found in common with test cases being analyzed and updating the minimal test case data structure by adding test cases whose key terms are removed from the key term data structure. This is continued until test cases are exhausted or until key terms of the requirements are accounted for in the test cases listed in the minimal test case data structure. The process of software testing is made more efficient by identifying the minimal number of test cases needed to address the functionality of the software application as specified in the requirements.

The quantified implicit relationships derived through computation can be combined with relationships that are explicitly established to derive other relationships. Explicit relationships between concepts are provided by modeling tools, for instance. Some of the explicit relationships can also be specified manually by a user. The quantified implicit relationships can be combined with explicit relationships to determine relationships between concepts that would otherwise have to be computed through a similarity analysis or defined explicitly, for instance. Thus, unifying links across several sets of concepts can be established by combining relationships that are expressed explicitly with implicitly expressed relationships that are derived through computation.

Additional features and advantages will become apparent from the following detailed description of illustrated embodiments, which proceeds with reference to accompanying drawings.

BRIEF DESCRIPTION OF THE FIGURES

FIG. 7 is a block diagram illustrating an exemplary matrix of relationship quotients between concepts of two different software design artifacts.

FIG. 8 is a block diagram illustrating exemplary user interface elements presenting an exemplary summary of quantified relationships between concepts of software design artifacts.

FIG. 16 is a block diagram illustrating an exemplary matrix for displaying relationship information between concepts extracted from the two software artifacts with a combination of relationships including explicit relationships between some concepts and implicit relationships between other concepts derived through computation.

DETAILED DESCRIPTION

Exemplary Relationships Between Software Design Artifacts

Figure 1:
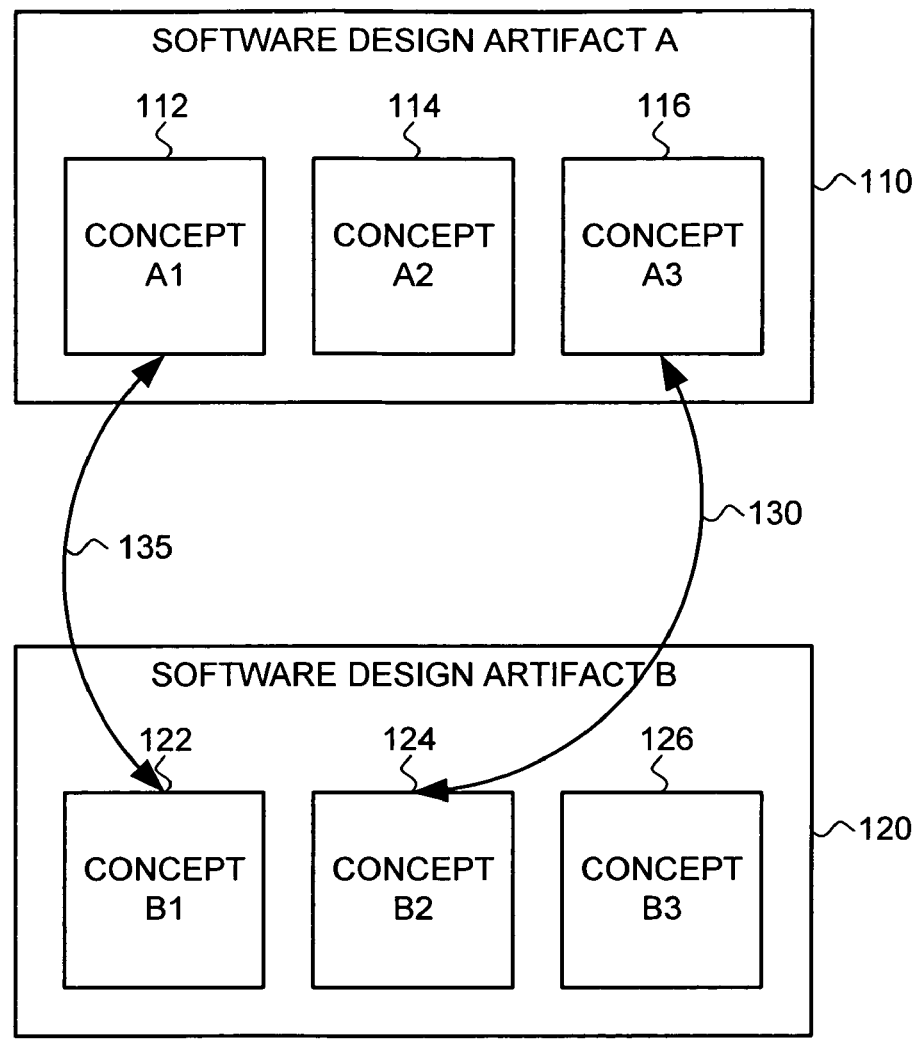
FIG. 1 is a block diagram illustrating exemplary relationships between concepts of different software design artifacts.

FIG. 1 illustrates exemplary relationships between software design artifacts. For instance, a first software design artifact 110, such as a requirements artifact for a software application, may have a quantifiable relationship to a related second software design artifact 120, such as a test plan artifact for the same application. The relationship between software design artifacts can be based in part on specific quantifiable relationships between components (e.g., 112, 114, and 116) of one software design artifact (e.g., 110) with components (e.g., 122, 124, and 126) of another (e.g., 120). Components of software design artifacts are referred to hereafter as concepts.

For instance, for a requirements artifact, the component concepts can comprise specific individual descriptions of various requirements related to a software application. Such requirements can be functional in nature, such as a particular expected response from an application for a particular type of request. Such requirements can also be security related requirements, such as restrictions on access to certain functionalities of the software for selected users. For a test plan document, the concepts can include individual test cases. For class description artifacts, the concepts can include descriptions of individual classes, such as their methods, attributes, and hierarchical relationships to other classes, for instance. For use-case artifacts, the concepts include individual use-case descriptions.

In one embodiment, relationships (e.g., 130 and 135) between concepts (e.g., 112 and 122) of different software design artifacts 120 and 110 can be quantified based on a relationship quantifier (e.g., a quotient) that quantifies the relationship based on an analysis of similarity between the concepts. According to one embodiment, the evaluation of the similarity is based on determining common occurrences of selected key terms used in the concepts being compared. In this manner, relationships that are only implicit during the course of software development activity can be identified. Armed with such information, a software engineer can make better decisions about his or her design changes.

For instance, the quantification of the relationships allows for impact analysis whereby the impact that a change in a requirement can have on a related test case can be established based on a relationship quotient between the requirement and the test case. Also, given a high degree of correlation between two concepts, a software engineer could be informed that he or she should make changes to a second concept, if he or she is changing the highly correlated first concept, for instance.

Although methods and system for establishing traceability between software artifacts are described herein with respect to artifacts related to software designs, the principles described herein can be applied to a variety of artifacts and is not restricted just to software design artifacts. For example, this method can also be used to determine relationships between E-mails and to build conversation threads, between various artifacts related to various entities and associated products.

Exemplary Methods of Determining Relationships Between Concepts

Figure 2:
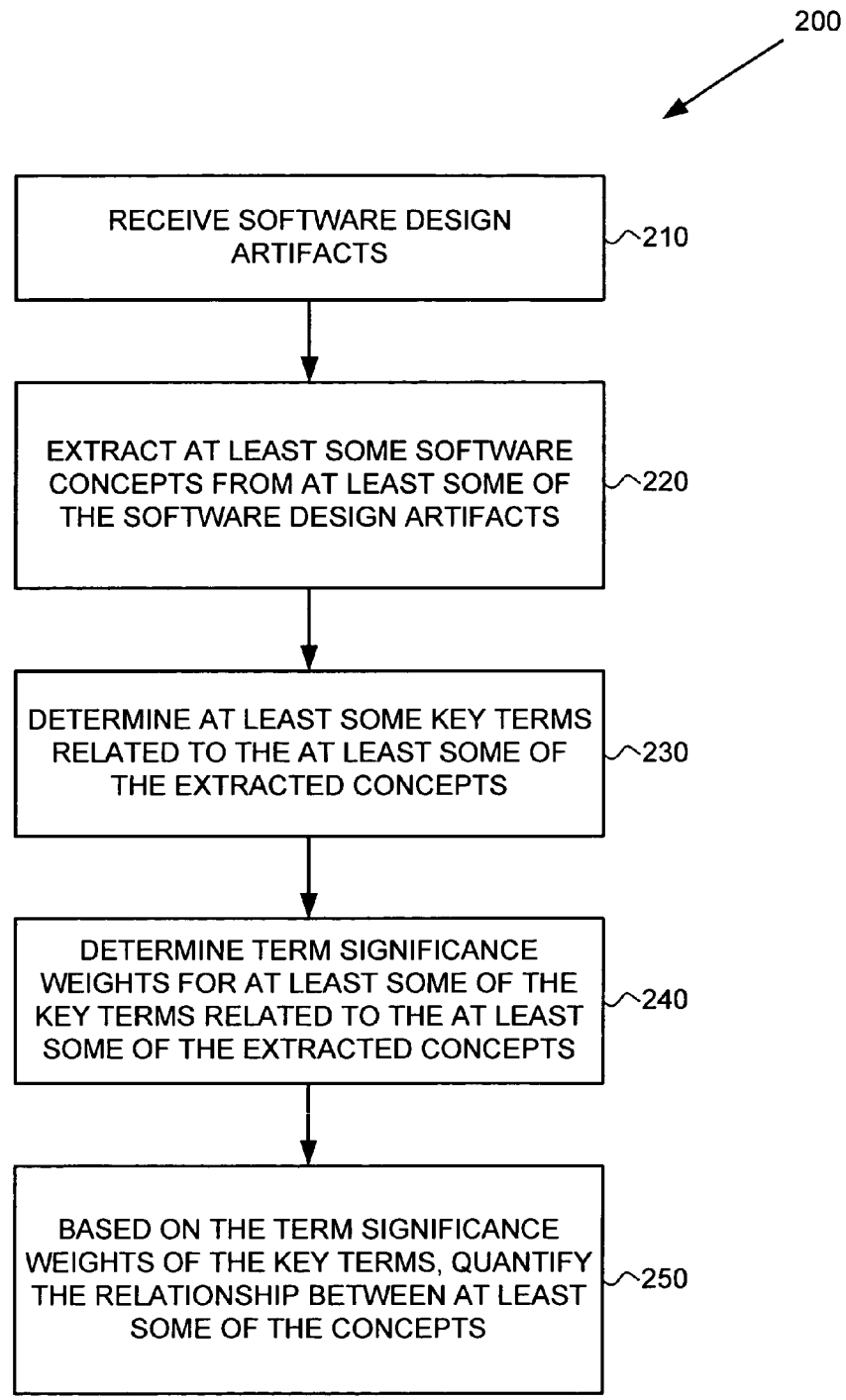
FIG. 2 is a flow diagram describing an exemplary method for quantifying relationships between concepts of a plurality of software design artifacts related to a software application design.

FIG. 2 illustrates an exemplary overall method 200 for determining and quantifying the relationships between concepts associated with various software design artifacts. According to the method 200, at 210, data representing at least some software design artifacts is received by a parser (e.g., 317 in FIG. 3). At 220, at least some concepts are extracted from at least some of the software design artifacts. For instance, a software requirement artifact may be parsed to extract individual requirements therein. Then at 230, key terms comprising words and phrases are extracted from at least some of the extracted concept descriptions. For instance, words and phrases from a requirement concept can be identified. It is on the basis of these key terms, in this example, that the relationship between concepts can be quantified in a similarity analysis. However, not all key terms need be treated as equally important in this analysis. For instance, certain key terms may be too ubiquitous throughout the various software design artifacts of a given business enterprise. For instance, it may not be desirable to base a determination of similarity between two concepts related to a banking enterprise based on the key term of "account" since "account" could appear in nearly every requirement and, as a result, all documents would appear more closely related than they actually are.

Accordingly, at 240, term significance weights are desirably calculated for at least some of the key terms identified at 230 to quantify the significance of key terms prior to a similarity analysis between at least two concepts for establishing a relationship quotient quantifying their relationship. At 250, similarity between two concepts can be quantified, in this example, by determining at least how many of the key terms the concepts being analyzed have in common. The term significance weights are used in such a similarity analysis to adjust the significance of the various key terms to avoid the similarity to be based too heavily on terms that may not be important to the software design in question.

Exemplary Software Artifact Relationships Traceability Tools

Figure 3:
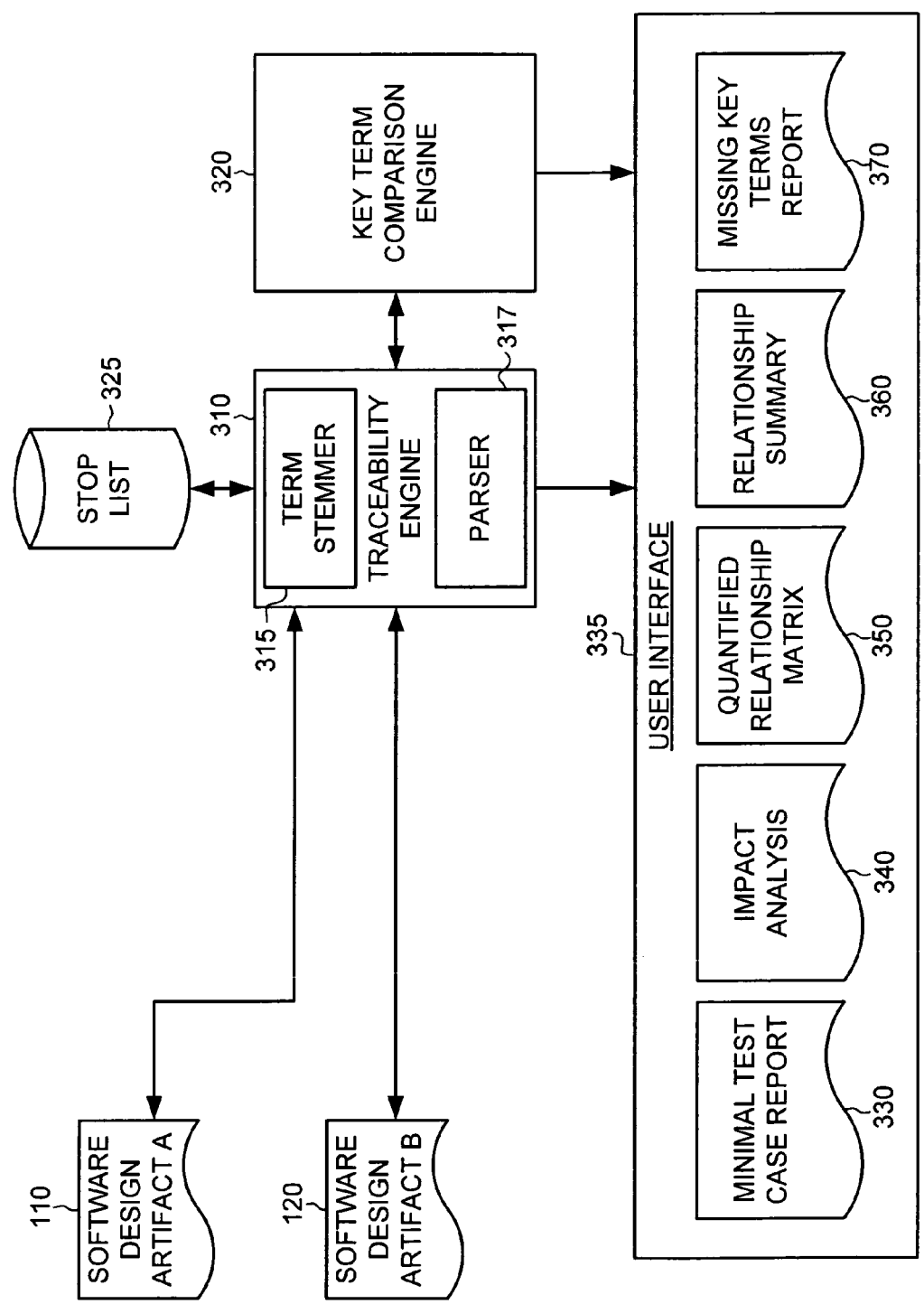
FIG. 3 is a block diagram illustrating exemplary tools and systems for implementing tracing relationships between concepts of a plurality of software design artifacts related to a software application design.

FIG. 3 illustrates exemplary tools, such as a traceability analysis engine 310 and key term comparison engine 320 for implementing at least some of the methods of determining traceability between software artifacts (e.g., 330 and 340) described herein. In one embodiment, the traceability analysis engine 310 can implement the overall method 200 for determining quantified relationships between concepts of different software artifacts (e.g., 110 and 120). The results can then be shared, for example, via a user interface 335 as one or more reports (e.g., 330, 340, 350, 360, and 370) to be used in improving software development processes. The key term comparison engine 320 is operable for comparing one or more sets of key terms related to concepts of different software artifacts for use in generating reports, such as a missing key terms report 370. Furthermore, the key terms comparison engine 320 is desirably communicative with the traceability analysis engine 310 and is operable for sharing data and generating the reports (e.g., 370).

Exemplary Methods for Extracting Concepts from Software Design Artifacts

Figure 4:
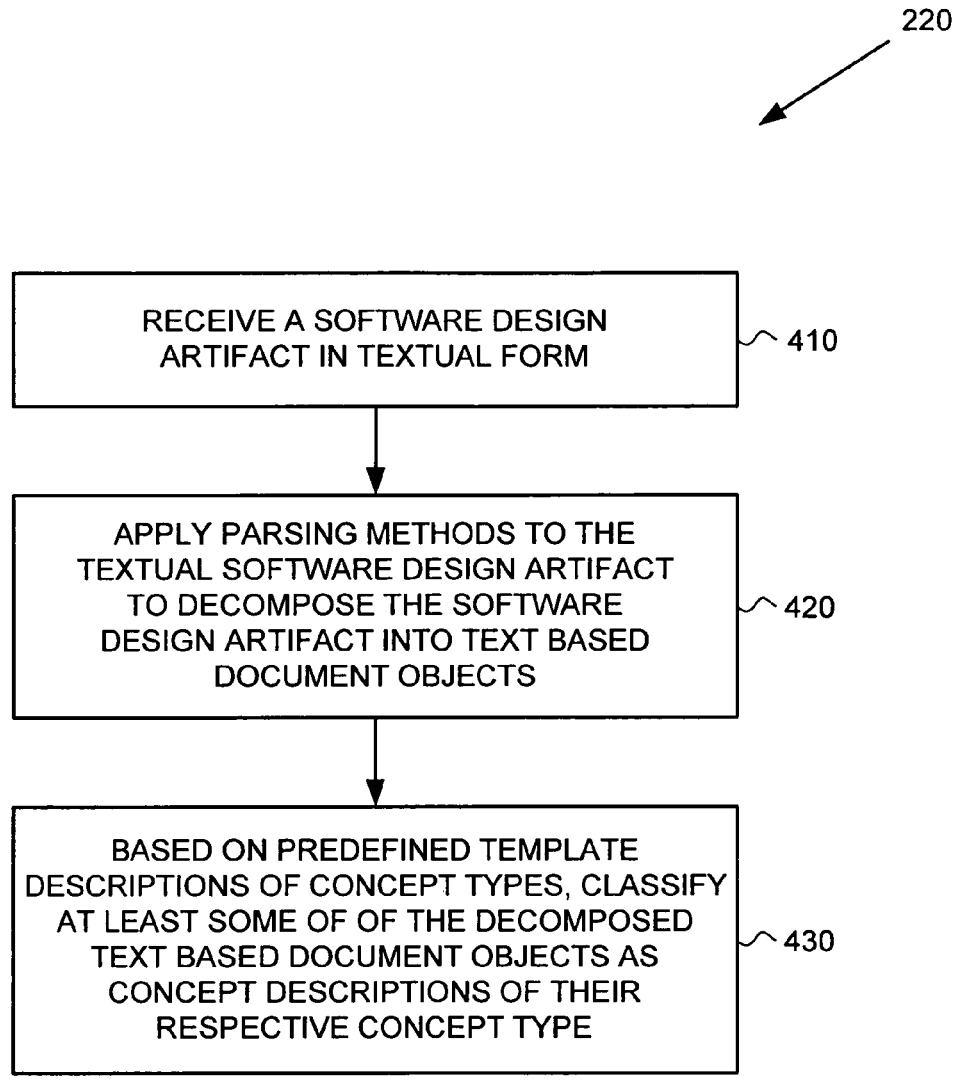
FIG. 4 is a flow diagram describing an exemplary method for extracting concepts associated with software design artifacts.

FIG. 4 illustrates an exemplary method 220 (FIG. 2) for extracting concepts from a software design artifact. At 410, a selected software design artifact in textual form is received by a text parser (e.g., 317 of FIG. 3), which at 420, in this example, applies parsing methods to decompose the software design artifacts into text based document objects. Then at 430, based, for example, on pre-determined templates that correspond to different types of concepts, the document objects are classified as being different types of concept descriptions. The document objects can be words, phrases, sentences, paragraphs, and other units of text. For instance, some of the document objects extracted from a requirement artifact are individual requirements and can be so identified based on a comparison of the object to a pre-determined template. The textual form of the software design artifacts may be in the form of various file formats, such as a .pdf, .doc, .rtf, and .html, for instance. Regardless of their file format type, the software design artifacts can be decomposed during the parsing and mapped to a template and based on such mapping, the various concepts can be identified and extracted.

Such use of templates will be particularly beneficial, if the various software design artifacts are written in a manner conforming to the template.

Non-template based freeform extraction of concepts from a software design artifact is also possible. For instance, the fact that selected terms and phrases are used in various types of concepts can be leveraged to determine concepts. Requirements typically use terms, such as "should", "shall", and "must." Other techniques, such as using topic-detection to determine a change in context, or the topic of a paragraph, or a flow of paragraphs, can also be used.

User-assisted extraction of concepts is also possible. One such method would be to mark the concepts in the document using pre-defined style formats or 'smart tags'. For example, a new style format (say 'Concept') can be created. The text representing a concept can be formatted with this new style ('Concept'). These concepts can then be extracted by the tool.

Exemplary Methods of Extracting Key Terms from a Concept

Figure 5:
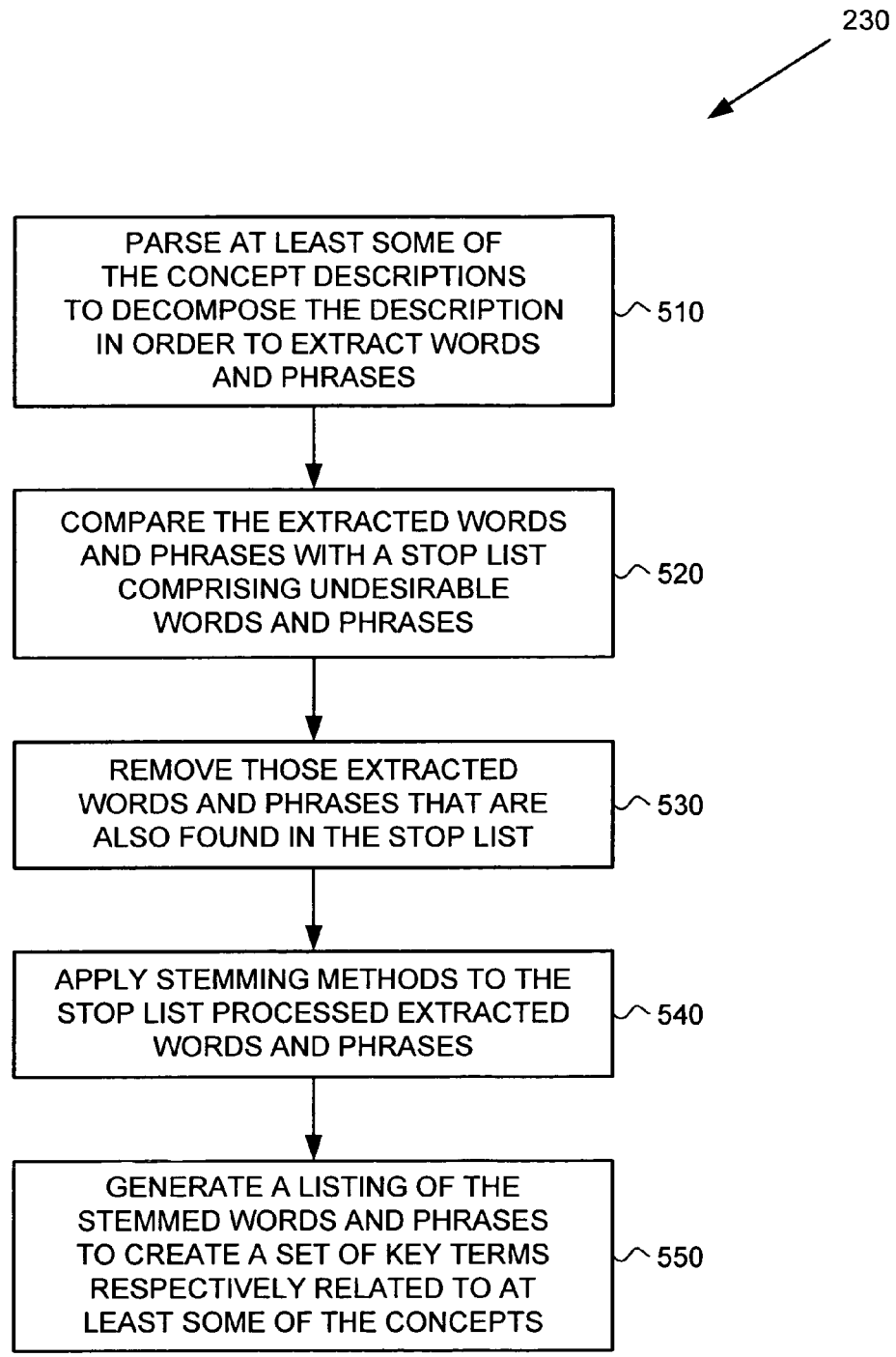
FIG. 5 is a flow diagram describing an exemplary method for extracting key terms associated with extracted concepts of software design artifacts.

Once the individual concept descriptions are extracted (e.g., FIG. 4), they can be further decomposed into individual words and phrases for determining key terms that will be used in a similarity analysis. FIG. 5 illustrates such a process 230. At 510, the extracted concept descriptions are desirably parsed. In such parsing, patterns of words and parts of speech can be used to isolate meaningful sentences and phrases. Typically not all extracted words and phrases are of value in a similarity analysis. For instance, articles, such as "a", "an", and "the" and conjunctions, such as "and" can be deemed to not be of value in a similarity analysis and can be eliminated. Thus, at 520, a database of stop list words (e.g., 325 in FIG. 3) is consulted to determine which of the words and phrases extracted from a concept are found in the stop list. Then at 530, these words and phrases on the stop list are desirably removed from further consideration in the similarity analysis.

Furthermore, some of the words extracted from a concept can be stemmed prior to conducting a similarity analysis with another concept. By stemming it is meant breaking down words to their root, or one or more syllables, or word portions and then treating such words broken down to the same stemmed root as if they are identical during a similarity analysis. This is so, because words with similar root forms, such as "saving" or "savings", may have similar meaning in usage such that their presence in concepts being analyzed should be accounted for as if they are identical during a similarity analysis. Thus, at 540, stemming methods are applied to the words by a stemmer 315 implemented by the traceability engine 310 in FIG. 3. In the above example, a stemmed version of the key terms "saving" and "savings" can be "sav," or "saving," for instance.

There are many methods that can be suitably used for stemming. One such method is the Porter's stemming algorithm. At 550, a listing of the set of key terms comprising words and phrases of a concept to be used in a similarity analysis with another concept is generated. In one embodiment, this list may comprise words and phrases that been processed through the stop list processing (530), or have been processed through the stemming methods (540), or both.

During the extraction of the key terms at 510, additional attributes can be extracted about the key terms using parts-of-speech analysis, word-sense-disambiguation, and word patterns, for instance. These attributes can describe the key terms and their specific form and/or context of usage in the concept. For example, "watch" when used in its noun sense would be an "object", while in its verb sense it would be an "activity". It is also possible to identify roles and relationships in an entity to make sense of words that describe the entity. Entity relationships describe relationships between actors (e.g., "Supervisor", and "Sales manager"), locations (e.g., "Dallas", and "Northern plant"), organizations (e.g., "ABC Corp"), specific persons (e.g., "John"), and objects (e.g., "sales order", "invoice").

The extraction of the attributes could be aided by domain ontology or a form of thesaurus that captures information that further describes the domain entity belongs to. The domain ontology could be a searchable database and have information like "sales manager" is a specific variant of "manager" and that "operator" reports to a "supervisor". The domain ontology could also have descriptions and relations pertaining to the domain/industry/organization etc., for example, information about organizations, product-related information and so for the which are typically referred to as Entity Descriptions and Entity Relationships.

Such information improves the ability of deciphering a key term's meaning not just based on its syntactic representation but also based on its semantic use. For instance, in a statement such as, "John, from the dispatch section, sent the package", the relationship role of John in the organization can be deduced. The relationship of "dispatch section" to the "send" activity can also be deduced with help of the available domain ontology. Furthermore, if certain roles or relationships are not represented exactly in a current form of the domain ontology they can be inferred instead and added to the domain ontology to further enhance the domain ontology.

Thus, domain ontology comprising information related to Entity Descriptions and Entity Relationships can be used to enhance the similarity analysis at least because similarity analysis based on key terms will not be based solely on syntactical similarity between key terms but it is also based on semantic meaning of the key terms. For instance, the key term "watch" as an "activity" will be not be considered equal to "watch" as an object. Further, based on entity relationship data of a domain ontology database, for instance, it can be determined that the term "sales manager" is a specific form of "manager" and hence, in a similarity analysis they can be considered to be similar key terms. Also based on the domain ontology data, the key terms "order" and "invoice" can be established to be related terms even though they are not similar syntactically. Thus, at least for the purposes of a similarity analysis, these words can be similar.

When a domain ontology or a dictionary is not complete, heuristics can be used to derive the additional information based on the context. A degree of confidence or certainty can also be associated with the descriptions inferred using heuristics. For instance, in a sentence like "Asimo moved towards the door", 'Asimo' is likely to be an actor, a person or a system, based on the activity 'move'. But in a sentence "Asimov wrote science fiction", 'Asimov' is most likely a person from the activity 'write'. Furthermore for instance, it can be inferred that a "Zonal manager" is a variant of manager, even when "zonal manager" is not defined in the ontology. In "A log entry is made by the system", "log entry" can be assumed to be an object as the verb used is "made" and also from the article 'a' in 'a log entry'. "The requestor sends a notice to the Order system." Here, the requestor is the subject, doing some action. So, he can be a person/role or a system. From the word pattern ' . . . or', it is more likely that the requestor is a role. For example, in a phrase like "the X" or "a X", the term "X" is less likely to be a person but could be a role, object etc. Such information regarding key terms can assist in a similarity analysis.

Exemplary Similarity Analysis Measurements

Once the lists of key terms are available for the various concepts (e.g., 550), a similarity analysis can be conducted in order to establish a quantifiable relationship between the concepts. Such an analysis can include applying term significance weights to ensure the analysis is done in a manner that determines the similarity between concepts based on appropriate significance accorded to occurrences of the various key terms on which the analysis relies. A Cosine Measure analysis is one of the many different possible similarity measurement analyses that are suitable for determining similarity between two sets of key terms and, thereby, establishing a relationship between two concepts corresponding thereto.

The use of Cosine Measure (also referred to as Dot Product) for similarity analysis is described below with reference to examples. The correlation between two concepts is calculated using Cosine Measure as follows:

$$\text{Similarity}(x, y) = \frac{\sum_j f_{x,j} \times f_{y,j}}{\sqrt{\sum_j f_{x,j}^2 \times \sum_j f_{y,j}^2}}$$

Where, $f_{x,j}$ denotes the frequency (Number of occurrences) of word j in concept x. Here in this example, the concepts whose relationship is being measured are x and y.

Consider x and y as the following two concepts comprising a use-case description and possibly a related class description:

Use-case1—Customer gets the Spot Deals Sales information from Wholesale Portal system. Customer views Spot Sales Deals for the region the customer is authorized to view Spot Sales Deals.

Class1—Spot Sale Controller—This session bean is used to create spot sales in the system.

Suppose the list of key terms in Use-case1 and Class1 and the frequency of their occurrence therein are as listed in Table 1 below.

TABLE 1

| Keyword | Frequency in Use-case1 | Frequency in Class1 | Keyword | Frequency in Use-case1 | Frequency in Class1 |
|---|---|---|---|---|---|
| Customer | 2 | 0 | Portal | 1 | 0 |
| Spot | 3 | 2 | System | 1 | 1 |
| Deal | 3 | 0 | Wholesale Portal | 1 | 0 |
| Sale | 3 | 2 | Wholesale Portal System | 1 | 0 |
| Spot Deal | 1 | 0 | View | 2 | 0 |
| Spot Deal Sale | 1 | 0 | Spot Sale | 2 | 2 |
| Information | 1 | 0 | Spot Sale Deal | 2 | 0 |
| Wholesale | 1 | 0 | Region | 1 | 0 |

Applying the Cosine Measure formula listed above to the data provided in Table 1 yields the following:

$$\sum_j f_{x,j} \times f_{y,j} = 2 \times 0 + 3 \times 2 + \ldots + 1 \times 0 = 17$$

$$\sum_j f_{x,j}^2 = 2^2 + 3^2 + \ldots + 1^2 = 53$$

$$\sum_j f_{y,j}^2 = 0^2 + 2^2 + \ldots + 0^2 = 13$$

$$\sqrt{\sum_j f_{x,j}^2 \times \sum_j f_{y,j}^2} = \sqrt{53 \times 13} = 26.2488$$

$$\text{Similarity}(x, y) = \frac{17}{26.2488} \approx 0.65$$

Thus, based on the selected key terms listed in Table 1, the relationship between Use-case1 and Class1 is quantified as 0.65. The Cosine Measure quantifies the similarity-based relationship between two concepts between the values of 0 to 1 with the closest relationship being quantified as 1 and the least close relationship being quantified as 0.

Also, as noted above, information from domain ontology including Entity Descriptions and Entity Relationships can be used to enhance the similarity-analysis measurement.

Exemplary Methods of Determining Term Significance Weights

One modification to the Cosine Measure method for determining similarity between concepts relates to addressing the fact that, in some software designs, the similarity analysis between concepts may depend far too much on certain key terms that are ubiquitous in many of the artifacts related to the particular type of enterprise. As a result, concepts that may not have a significant substantive relationship may nevertheless be determined to be similar based on the occurrence of such ubiquitous terms. One way to address this problem is to calculate the term significance weights for at least some of the key terms and apply these term significance weights as coefficients in a similarity analysis (e.g., 240). For instance, these term significance weights can be applied as coefficients of the key term frequencies in a Cosine Measure analysis to weight the term frequency numbers.

Figure 6:
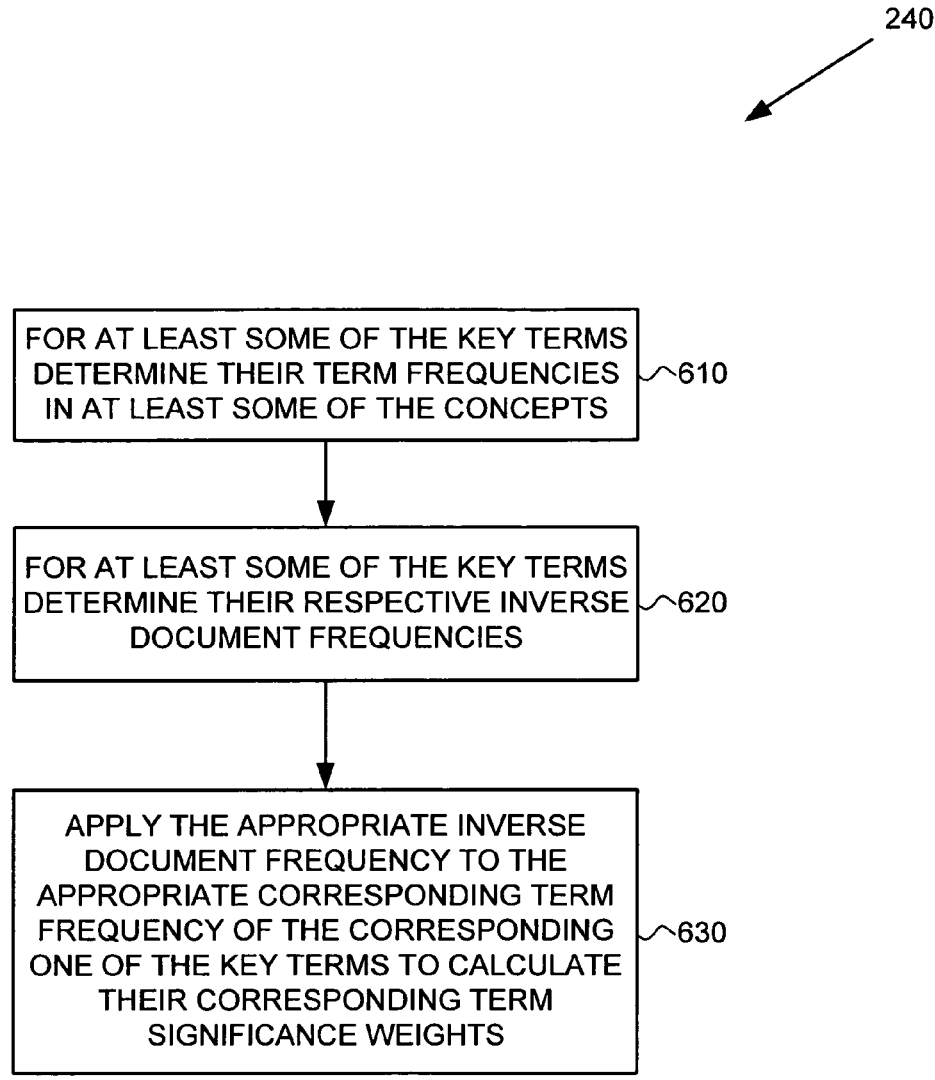
FIG. 6 is a flow diagram describing an exemplary method for determining term significance weights of key terms to be applied during a similarity measure between concepts of different software deign artifacts

FIG. 6 illustrates one method 240 for implementing a similarity analysis with term significance weights. At 610, for at least some of the key terms of the concepts being analyzed, their respective term frequencies are determined. Term frequency for a selected term in a selected concept is determined by counting the number of times the selected term occurs in the selected concept. Then at 620, the Inverse Document Frequency (IDF) for the key terms is also calculated at 630 and applied to the term frequencies to calculate term significant weights. The IDF measure is one type of a term significance weight that provides a realistic basis for determining a given term's importance in a similarity analysis (e.g., Cosine Measure) while quantifying a relationship between concepts. One form of the IDF attenuates or accentuates the term frequency of a selected key term within a selected concept on the basis of the selected term's degree of ubiquity throughout a larger domain, such as the entire design artifact to which the concept belongs or all other artifacts related to the same enterprise.

For instance, consider the following set of requirement concepts:

i) Account Holder should login with username and password.
ii) Account Holder should be able to view his Savings Account summary.
iii) Account Holder should be able to transfer funds from his Savings Account to his Current Account.

The term frequency for the various key terms of requirement listed above as (iii) may be as follows:

Account=3; Holder=1; transfer=1; funds=1; Savings=1; Savings Account=1; Current=1; Current Account=1; and Account Holder=1.

Considering the requirement (iii), the term "Account" appears thrice, so it is the most important word from a term frequency perspective. On the other hand, the terms "Savings Account" and "Current Account" appear only once in this requirement. But, if the similarity analysis takes a broader perspective (e.g., across several requirements), it can be determined that the term "Account" is in fact too ubiquitous a term. Thus, considering only the term frequencies during a similarity analysis (e.g., Cosine Measure) would lead to the term "Account" to gain an inflated level of importance and, hence, adversely affecting the similarity analysis.

Calculating a term significance weight such as the IDF, for the key terms can, however, add a proper weight to the importance of the key terms during a similarity analysis. One exemplary IDF calculation is as follows:

$$IDF = -\ln\left(\frac{\text{Number of Concepts the term appears in}}{\text{Total no. of Concepts}}\right)$$

Accordingly, the IDF for the various key terms of the requirement (iii) listed above is as follows:

Account=0.0; Holder=0.0; login=1.1; username=1.1; password=1.1, Account Holder=0.0; view=1.1; Savings=0.4; Summary=1.1; Savings Account=0.4; transfer=1.1; funds=1.1; Current=1.1, and Current Account=1.1.

Thus, the IDF for "Account" is 0.0 and "Savings Account" is 0.4. So now when term significance weights, such as the IDFs, are applied as coefficients to the term frequency in a similarity analysis such as the Cosine Measure, the key term "Account" becomes less important while the key term "Savings Account" becomes more important, which is desirable.

Exemplary Results of Similarity Analysis

The relationship quotients that result from a similarity analysis between concepts of different software design artifacts can be captured in the form of the exemplary matrix 700 as shown in FIG. 7. The illustrative matrix 700 has captured the relationship quotients for a set of classes 710 and a set of use-cases 720. Based on such quantification of the relationship it can be determined, for instance, that Class 14 at 715 is closely related to Use-case 9 at 725, whereas Class 9 at 717 and Use-case 6 at 727 appear to have no relationship. Thus, based on this information, a traceability tool (e.g., 310 of FIG. 3) can alert a user to the fact that, if changes are to be made in Use-case 9 at 725, then Class 14 at 715 should be examined to address the impact of such changes. More importantly, if the similarity values against a particular concept are low, a traceability tool (e.g., 310 in FIG. 3) can explicitly or implicitly inform a user that the particular concept has no relations. For example, the tool may inform a user that a Requirement does not have any corresponding Test cases. Furthermore, a traceability tool (e.g., 310 in FIG. 3) can also explicitly or implicitly inform a user that no work is needed to, for example, address the impact of changes between Class 9 at 717 and Use-case 6 at 727 based on the low value of their relationship quantifiers.

One exemplary user interface 800 for sharing the relationship data in a user-friendly manner, as shown in FIG. 8. Instead of displaying the raw number of relationship quotients, as shown in the matrix 700, the exemplary user interface 800 displays the relationship of Use-cases listed in the column 810 with classes whose relationship with the Use-cases is categorized into High 815, Medium 820, and Low 825 columns. The categorization can be based on the relationship quotients expressed in the matrix 700 of FIG. 7, for instance. The High, Medium, and Low categorization of the relationships can be based on the relationship quotient measures within defined ranges of values for the various categories. In the exemplary matrix 700, the relationship quotient data resulting from a similarity analysis is normalized to better allocate the ranges for determining the categories. According to one exemplary method of normalization, the highest value relationship quotient in a given matrix is normalized to a value of 1 and the rest of the relationship quotients are normalized in value proportionally. This enables a user to set the ranges of values of the relationship quotients at a standard range of numbers without having to account for variances particular to concepts being analyzed.

Although it can vary, in one example, a normalized relationship quotient value range of 0.7 to 1 indicates a High level relationship, a range of 0.5 to 0.7 indicates a Medium level relationship, and the range of 0 to 0.5 indicates a Low level relationship.

An Exemplary Method of Implementing Impact Analysis

Figure 9:
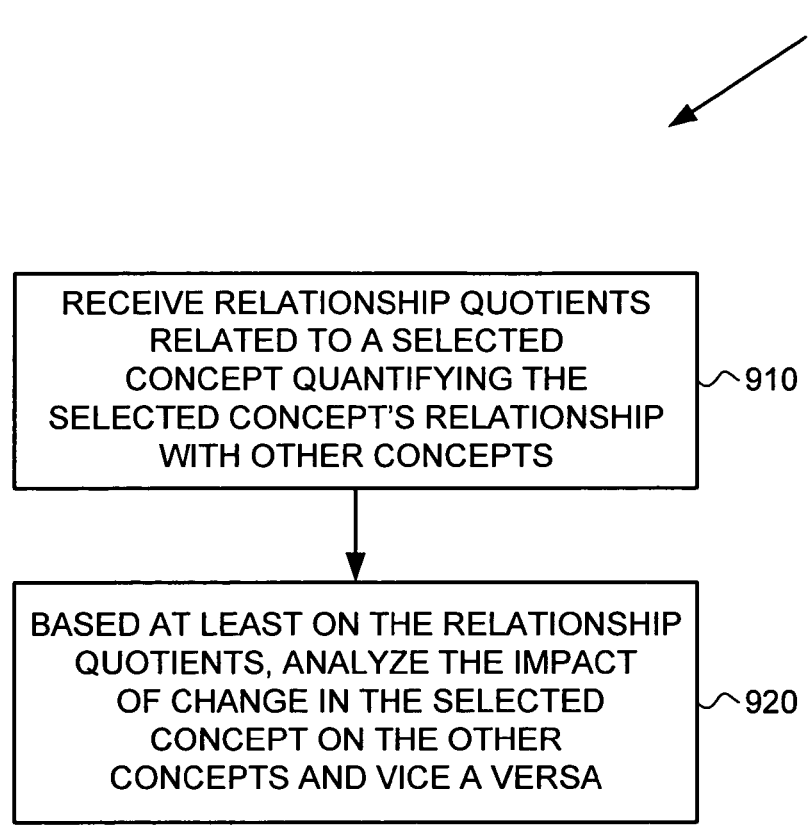
FIG. 9 is a flow diagram describing an exemplary method of performing impact analysis related to changes in related concepts of software design artifacts.

An impact analysis translates the quantified relationships between concepts to a level of impact a change in one concept can have on another concept based on the value of the relationship quotient. Based on this assessment, a software developer can gauge the impact of changes proposed for one aspect of the design might have on other aspects of the design. FIG. 9 describes a method 900 implemented by a traceability tool (e.g., 310 of FIG. 3) for implementing an impact analysis. At 910, the tool (e.g., 310) receives data related to relationship quotients of selected concepts and 920, based at least on the relationship quotient data, the impact of a change in one of the concepts on at least one of the rest of the other concepts in question is determined. The following example illustrates an exemplary impact analysis.

Suppose there exists a set of requirements $\{R_1, R_2 \ldots R_n\}$ and corresponding sets of design documents $\{D_1, D_2 \ldots D_n\}$, class specifications $\{C_1, C_2 \ldots C_n\}$, and test plans $\{T_1, T_2 \ldots T_n\}$. Now, if requirements $R_2$ is changed, all the other designs, class specifications, and test plans corresponding to requirement $R_2$, may have to be changed. Finding these other concepts (i.e., requirements, designs, class specifications, test plans, etc.) corresponding to a particular concept facilitates the determination of which of the other concepts may also require change. Using quantified matrices (e.g., 700 of FIG. 7), the traceability tool (e.g., 310) generates an impact analysis report 340 listing the potential impact that a change in one concept has on other concepts. Further, the strength of change impact can also be calculated. For example, the following Table lists the concepts related to the concept $R_2$ along with their similarity measure with $R_2$

TABLE 2

| Concept | Relationship Quotient |
|---------|----------------------|
| $D_3$ | 0.356 |
| $D_4$ | 0.802 |
| $C_6$ | 0.788 |
| $T_5$ | 0.600 |
| $D_7$ | 0.675 |
| $C_3$ | 0.018 |
| $C_9$ | 0.539 |
| $T_8$ | 0.981 |

Based on the data from Table 2 above, the impact of change in concept $R_2$ on $D_7$, $T_5$, $T_8$, $D_4$ and $C_6$ will be high. Whereas concepts $D_3$ and $C_9$ will experience a small impact, while $C_3$ is expected to experience almost no impact. This can help in planning tasks more accurately for a scope change request during the development process, for instance.

The impact analysis can also be performed once key terms have been added or deleted to alter a concept. The corresponding concepts that contain those added or deleted key terms can be considered in an impact analysis (e.g., including term weights). Furthermore, if one concept is changed by adding key term for instance, an impact analysis will inform a user which are the other concepts that may be affected and these concepts may be presented to a user for consideration. In one specific example, an added key term to a requirement may necessitate addition of a test case. However, a post addition impact analysis might reveal existing test cases that already address the testing related to the added key term. In this case, these test cases are presented to a user for consideration.

This can be implemented in a user interface which can instantly inform the user about the extent of impact and the impacted concepts, whenever a concept is modified.

An Exemplary Method for Key Term Comparison Analysis

Figure 10:
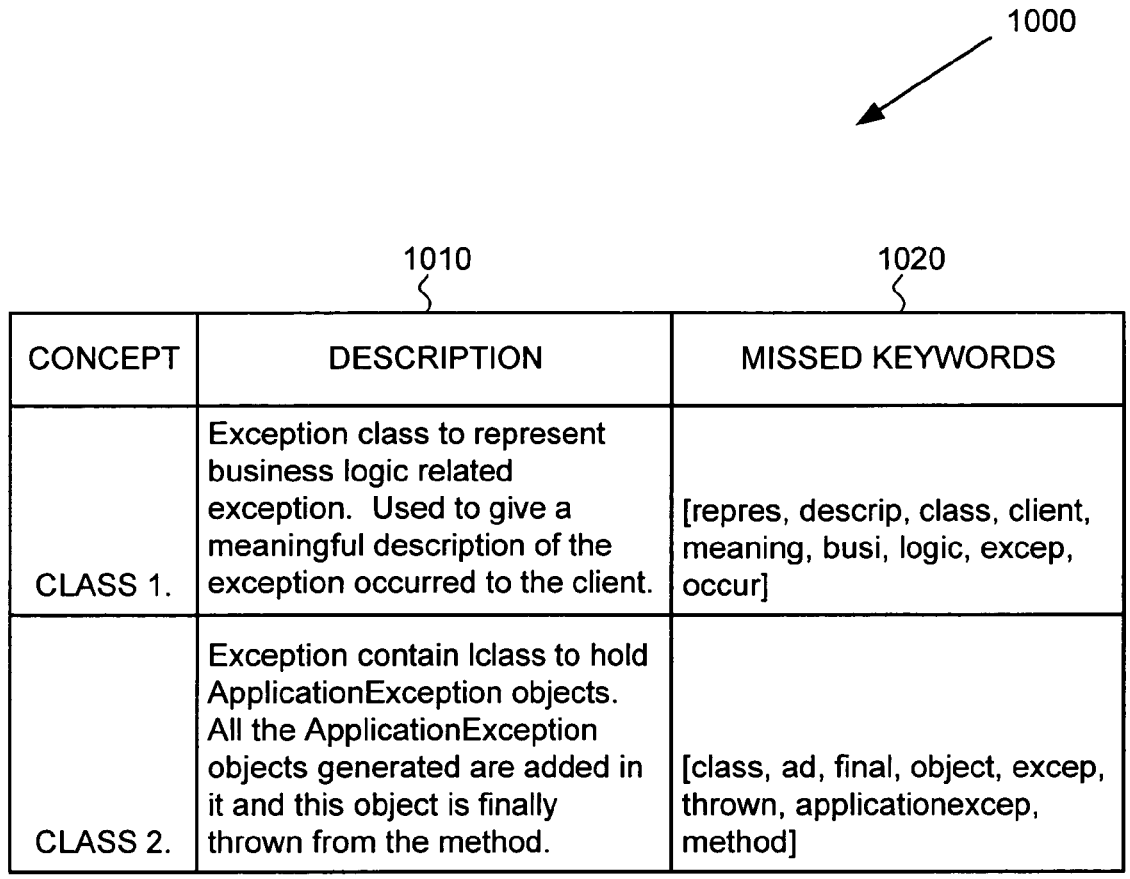
FIG. 10 is a block diagram illustrating an exemplary report of missing key terms resulting from a comparison of key terms related to a plurality of concepts of software design artifacts.

Once the key terms of a concept are extracted (e.g., as in FIG. 5), the listing, in addition to being used in a similarity analysis for determining quantified relationships between concepts, can also be used to compare selected key term sets of various concepts for reports useful for software development. For instance, by comparing the set of key terms associated with a selected concept to sets of key terms of other concepts of interest, flaws in the design of a software application can be detected. Suppose the key terms of a selected class description concept are compared to key terms of test case concepts of interest. This could yield a list of key terms of the selected class description concept that are not found in any of the test case concepts of interest. Such an exemplary comparison is presented as missed key terms report 1000 (of FIG. 10) that lists class descriptions 1010 and the corresponding missed key terms therein 1020 that were not found in any of the test cases of interest. Such a report 1000 can alert a software developer to the possibility that certain aspects of the class design are not being addressed in corresponding test cases, which could affect the quality of the release version of the software application. Accordingly, based on this alert, a software developer can add a test case to address the gap, for instance.

Figure 11:
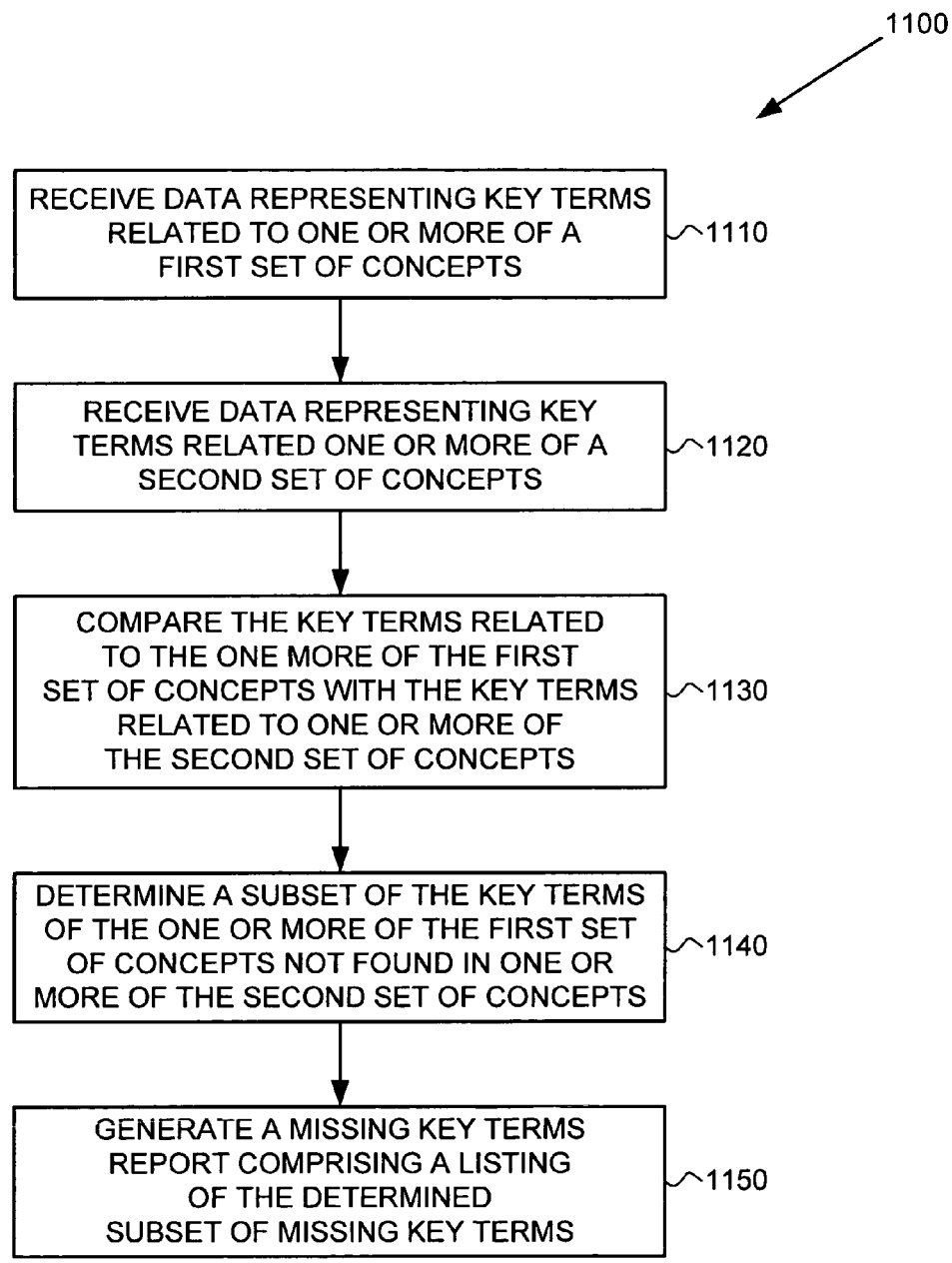
FIG. 11 is a flow diagram describing an exemplary method of generating a missing key terms report.

FIG. 11 describes an exemplary method 1100 for generating a missed key term report. At 1110, a key term comparison engine (e.g., 320 of FIG. 3) receives key terms related to one or more concepts of a first set of concepts and at 1120 it receives key terms related to one or more concepts of a second set of concepts. At 1130, the key terms of one or more of the first set of concepts is compared to the one or more concepts of the second set of concepts based upon which, at 1140, a subset of key terms of the first set of concepts not found in any of the second set of concepts is determined. Then at 1150, a missing key terms report (e.g., 1000 of FIG. 10) is generated for use in further analysis as described above.

Once the missed key terms between selected sets of concepts are available, other useful analysis of the data can be performed to further improve the software development process. During software testing, many redundant test cases that address substantially the same functionality of software application are often implemented. Accordingly, it is desirable to find a minimal set of test cases that cover the requirements of a software application is desirable. One manner in which this can be automated is by post-processing the output from the comparison analysis (e.g., 1100 of FIG. 11) implemented by the key term comparison engine (e.g., 320 of FIG. 3), for instance. Following is an exemplary step-by-step approach with applicable examples.

Consider a set of requirements $\{R_1, R_2, R_3, R_4, R_5, R_6\}$ with a corresponding set of test cases $\{T_1, T_2, T_3, T_4, T_5, T_6\}$ having the following key terms:

TABLE 3

| Requirement key terms | Test case key terms |
|---|---|
| $R_1 = K_1, K_2, K_3$ | $T_1 = K_5, K_{11}$ |
| $R_2 = K_4, K_5$ | $T_2 = K_2$ |
| $R_3 = K_1, K_4, K_6$ | $T_3 = K_1, K_2, K_3, K_6, K_{12}$ |
| $R_4 = K_7, K_8, K_9$ | $T_4 = K_{10}, K_{11}, K_{13}$ |
| $R_5 = K_1, K_3$ | $T_5 = K_7, K_8$ |
| $R_6 = K_{10}, K_{14}$ | $T_6 = K_4, K_5, K_6$ |

Complete coverage of key terms of requirements in Table 3 above in the test by a minimal set of test cases can be achieved by creating a set of missed key terms (MK) which initially contains all the key terms that appear in all the requirements. Thus, such a set MK is initialized, in this example, to comprise $\{K_1, K_2, K_3, K_4, K_5, K_6, K_7, K_8, K_9, K_{10}, K_{14}\}$. Also a set of minimal test cases is created and initialized to null, for instance, as TC comprising { }. Later the test case with the most number of key terms appearing in MK is added to the minimal set TC. In this example, the test case $T_3$ has the highest number of key terms in the current make up of the set MK so as a result, TC now comprises $\{T_3\}$. Also, all those key terms present in the test case $T_3$ can now be removed from MK. As a result, MK would then comprise $\{K_4, K_5, K_7, K_8, K_9, K_{10}, K_{11}, K_{14}\}$. We continue repeating these steps until MK is empty or none of the remaining key term elements of MK are covered by any test case. Thus, in the above example, the minimum set of test cases that covers most of the key terms of the requirements $\{R_1, R_2, R_3, R_4, R_5, R_6\}$ that the given set of test cases $\{T_1, T_2, T_3, T_4, T_5, T_6\}$ can possibly cover is determined to be TC comprising $\{T_3, T_4, T_5, T_6\}$.

In this example, key terms $\{K_9 \text{ and } K_{14}\}$ are not covered by any of the test cases $\{T_1, T_2, T_3, T_4, T_5, T_6\}$. Thus, as a result of this analysis, a developer can be informed of the lapse and he or she can add alter the existing test cases or add new test cases to address the gap. On the other hand the developer may decide not address the gap for various design specific reasons.

Figure 12A:
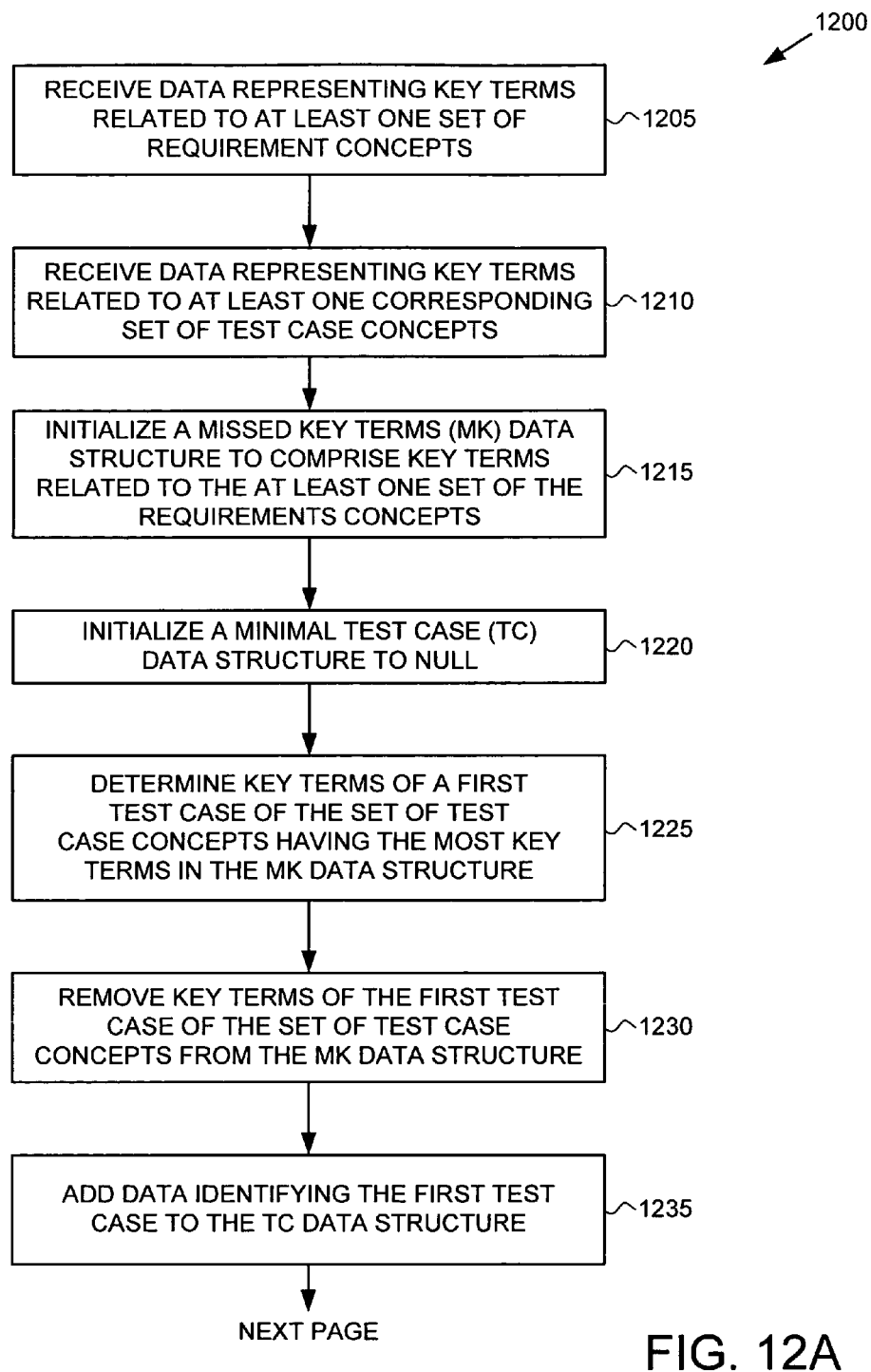
FIGS. 12A-B are flow diagrams describing an exemplary method for determining a minimal set of test cases for testing a given set of requirements.
Figure 12B:
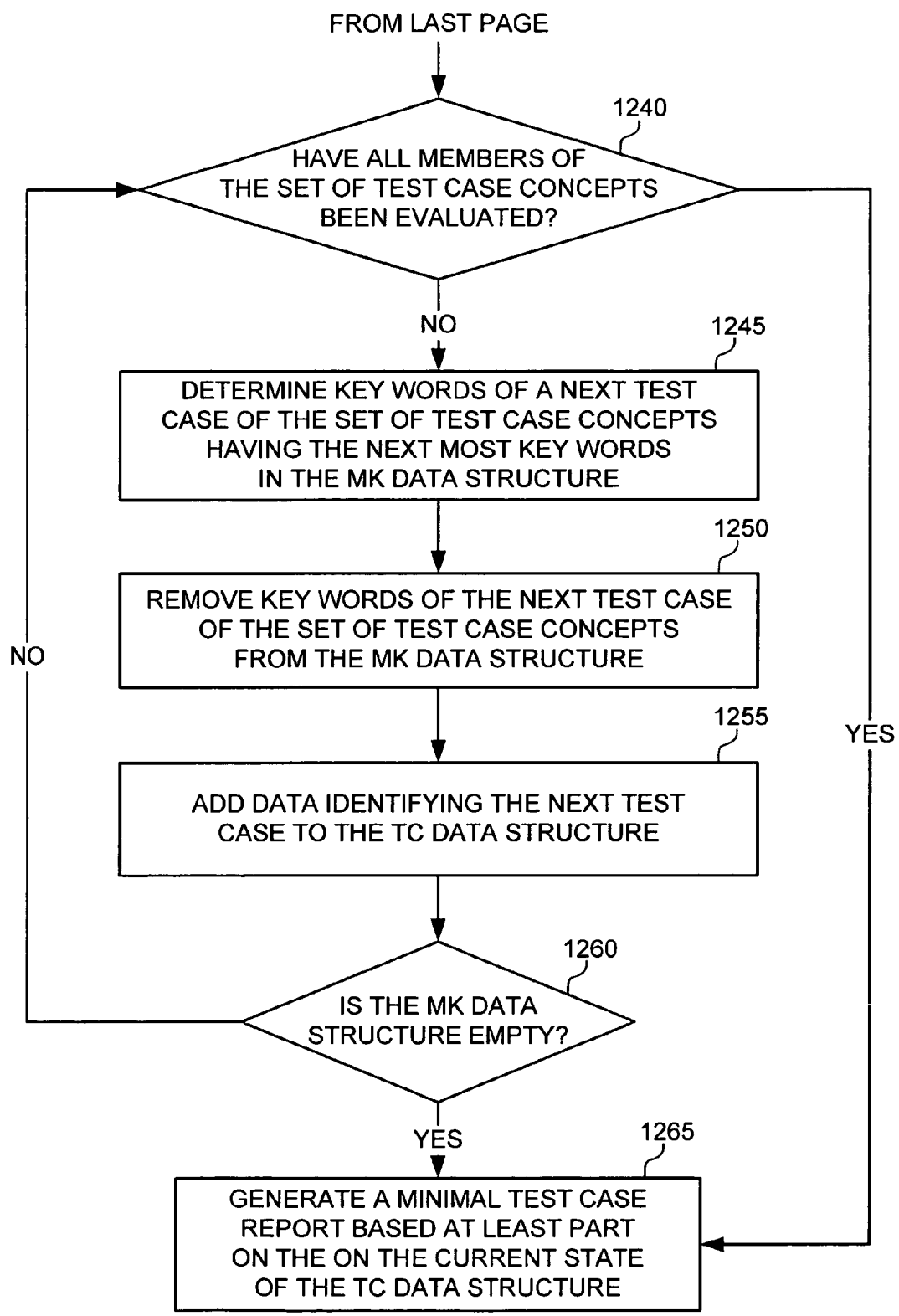

FIGS. 12A and 12B illustrate an overall method 1200 for identifying a minimal set of test case concepts for addressing testing needs related to key terms of a related set of requirement concepts. At 1205, a tool such as the key term comparison engine 320 of FIG. 3 receives a set of key terms related at least to one set of requirement concepts. At 1210, a set of key terms related to at least one corresponding set of test case concepts is received. At 1215, a missed key term data structure (MK) is first initialed to comprise of the key terms of the set of requirements. At 1220, a minimal test case (TC) data structure is first initialized with a null value. Then at 1225, the test case with the most number of key terms in common with the key terms currently in the data structure MK is identified and 1230 these key terms are removed from the MK data structure and at 1235 the test case so identified is added to the TC data structure. At 1240, as long as there are other test cases yet to be evaluated the method 1200 advances to 1245 where the next test case with the most number of key terms in common with the current key terms in the MK data structure is identified and at 1250 these key terms are also removed from the MK data structure. At 1255, this next test case is added to the TC data structure. Further at 1260, steps 1240-1255 are repeated so long as the MK data structure is not null or at 1240 there continue to be members of the set of test case concepts that have yet to be evaluated. However, at 1260 once the MK data structure is empty or there are no more test case concepts to be evaluated, at 1265 a minimal test case report (e.g., 330 in FIG. 3) is generated based at least in part on the current state of the TC data structure.

Identification of the minimal test case for testing a given set of requirements allows software developers to reduce the number of redundant test cases, thus, making the process of creating and testing software more efficient. An automated tool can calculate and present such information with minimal effort on part of the user.

Although the examples regarding minimal test case analysis are presented with respect to a comparison of key terms associated with test case concepts and requirement concepts these methods are equally applicable to any combination of concept types.

Exemplary Unified Relationship Traceability Analysis

The quantified trace relationships that are computed by a traceability engine (e.g., 310 of FIG. 3), for instance, can be combined with other relationships that are expressed explicitly. For instance, users can manually maintain explicit relationship traceability links between concepts of different software artifacts. Also, some software development tools create and maintain explicit relationship traceability links between selected concepts of some software artifacts. For instance, some modeling tools, such as Rational Rose® by IBM® Corp., are capable of maintaining explicit links between use-cases and class specifications associated therewith. Another modeling tool, InFlux by Infosys Technologies, Ltd., is capable of maintaining explicit links between use-cases and task flows associated therewith. Task flows typically capture the flow of activities being automated by the software as described with respect to the use-case. Thus task flows can include descriptions of functional requirements of an automated software system including how the system is supposed to function and it may also include a description of how the system is supposed to interact with a user or another system, for instance. Task flows can be represented in terms of textual descriptions as well as graphical descriptions. Conversions between such representations are also possible.

Figure 13:
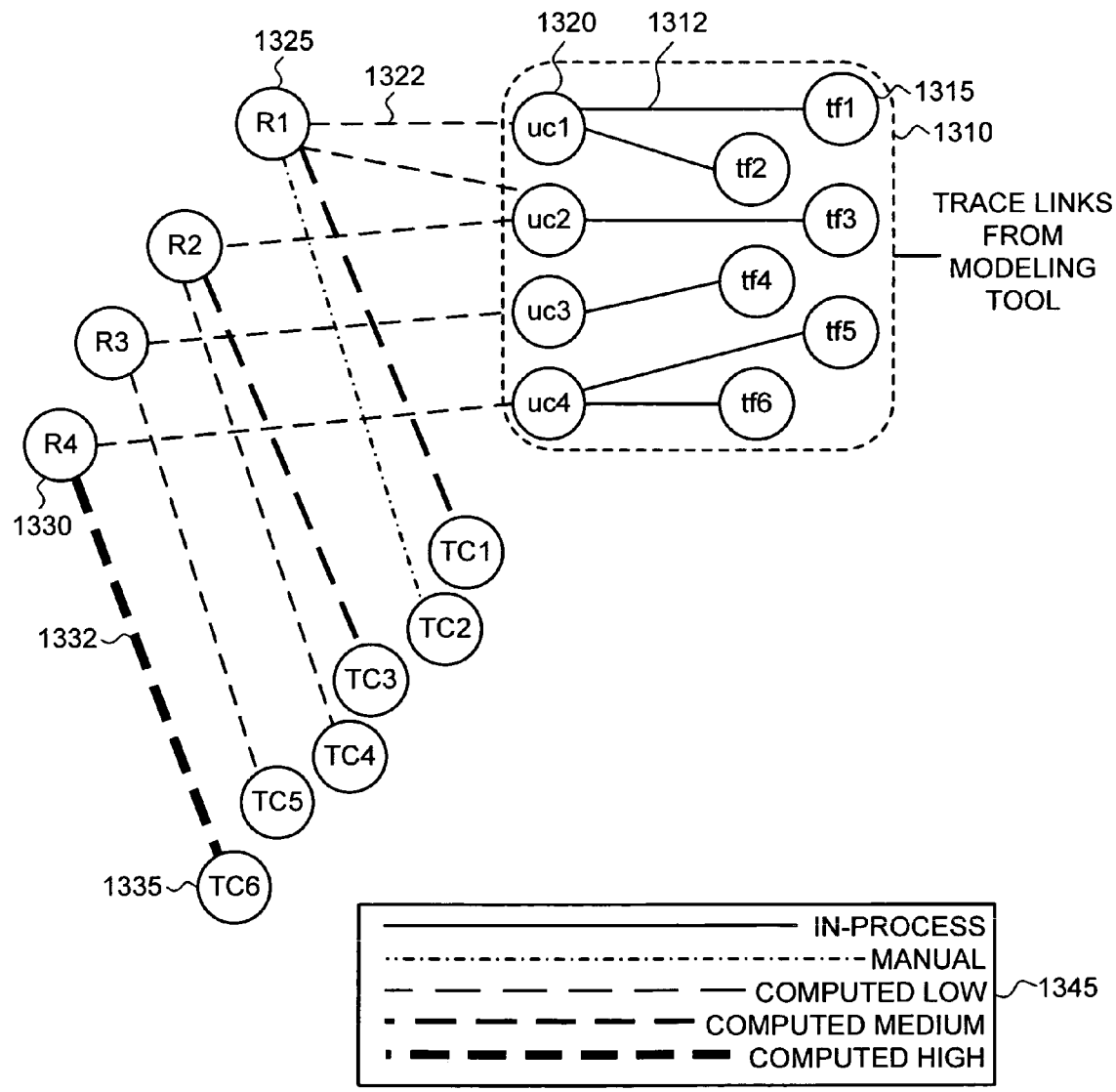
FIG. 13 is a block diagram illustrating an exemplary set of quantified implicit relationships conjoined with explicit relationships to establish unified traceability analysis.

If some explicit links are already in place (e.g., either user maintained or modeling tool maintained in-process relationships), there is a benefit to using them in order to establish relationship traceability links between concepts that otherwise may have to be computed. FIG. 13 illustrates unified relationship traceability links that conjoin implicit relationship links derived through computation (e.g., via method 200 of FIG. 2) with explicit relationship links to establish what can be a more comprehensive set of relationships. For instance, a modeling tool may have established and maintained the explicit relationships (e.g., in-process relationships 1312) between task flow concepts (e.g., $TF_1$ at 1315) and use-case concepts (e.g., $UC_1$ at 1320). This can be combined with the computationally-derived implicit relationships (e.g., 1322) between other concepts (e.g., use-case concept $UC_1$ at 1320 and requirement $R_1$ at 1325). By conjoining implicit and explicit links in this manner, previously undiscovered relationships between concepts, such as requirement concepts $R_1$ at 1325 and task flow concepts $TF_1$ at 1315 can be established. This can aid further analysis of the software design because, for instance, impact analysis of a change in requirement $R_1$ at 1325 can be performed not only with respect to use-case $UC_1$ at 1320 but also $TF_1$ at 1315. The same principle can be applied with respect to user-specified manual relationships (e.g., 1332) between a requirement $R_4$ at 1330 and $TC_6$ at 1335). This presents several advantages, including avoiding the unnecessary computation to derive relationships that may already have been established explicitly.

Figure 14:
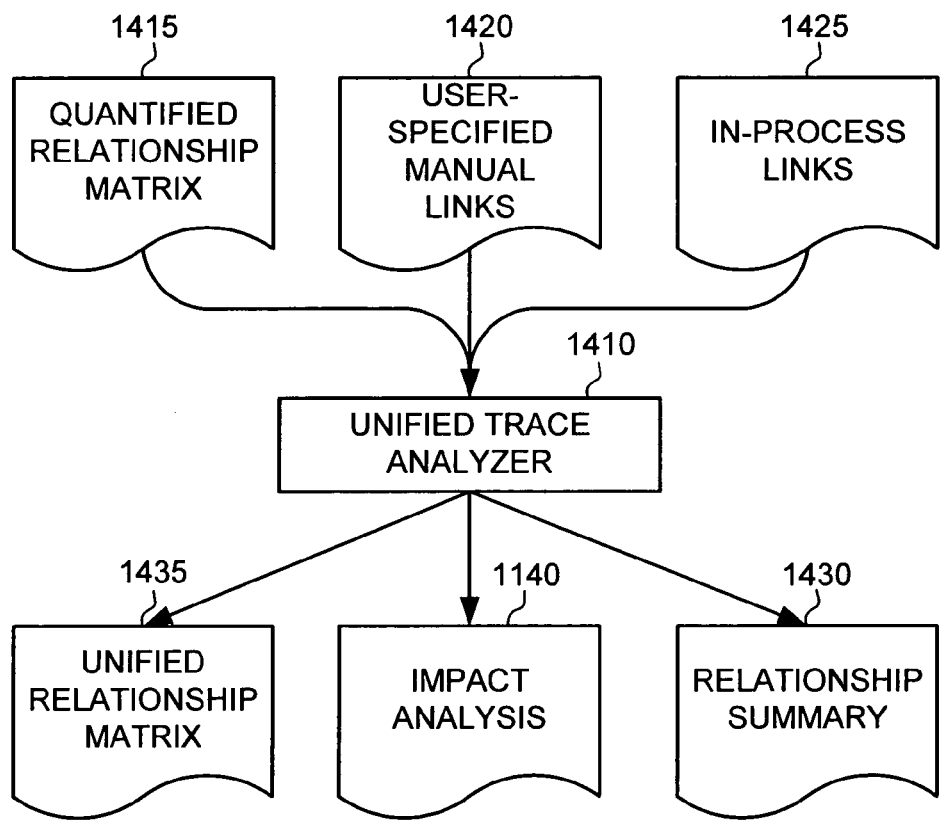
FIG. 14 is a block diagram illustrating an exemplary system for unified traceability analysis.

FIG. 14 illustrates an exemplary system for establishing unified traceability by conjoining implicit traceability links derived through computation with explicit traceability links (e.g., user-specified or via a modeling tool). Conjoining may be implemented by a unified traceability analyzer 1410 that receives the derived implicit traceability links via the quantified relationship matrix 1415 (e.g., as generated by a traceability engine 310), user-specified explicit manual links 1420 and explicit in-process links 1425 specified via a modeling tool, such as Rational Rose® by IBM® Corp or InFlux by Infosys Technologies, Ltd. In some implementations, explicit links may comprise just the user-specified manual links 1420 or just the modeling tool specified in-process links 1425. Nevertheless, the unified traceability analyzer 1410 can conjoin the explicit links (e.g., 1332 and 1312 of FIG. 13) with the implicit links (e.g., 1322) to provide impact analysis 1440, unified relationship matrix 1435 and relationship summary 1430 involving concepts who are now linked via a combination of implicit and explicit relationship traceability links (e.g., 1322, 1312, and 1332 of FIG. 13).

Figure 15:
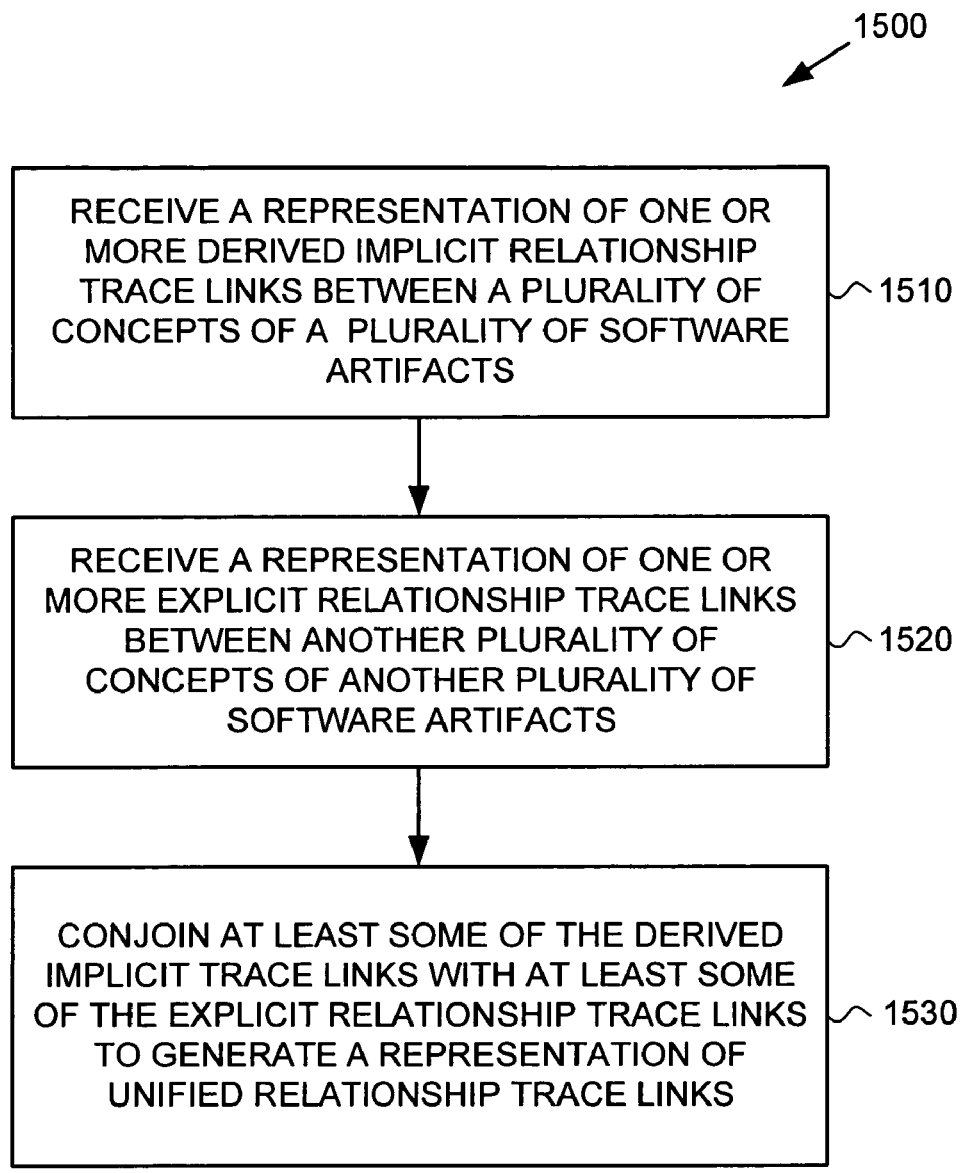
FIG. 15 is a flow diagram describing an exemplary method for determining unified traceability relationship links.

FIG. 15 illustrates an exemplary method 1500 for generating unified traceability links. At 1510, a representation of implicit traceability links derived via computation is received. The representation of implicit traceability links may be in the form of relationship matrices (e.g., 700 of FIG. 7) that provide quantified descriptions of relationships between a plurality of concepts of a plurality of software development artifacts. At 1520, descriptions of one or more explicit traceability links (e.g., user-specified manual links 1420 or just the modeling tool specified in-process links 1425) are received. Then at 1530, one or more of these implicit and explicit links are conjoined to derive at least some unified links that establish a relationship between concepts that were not known previously to be related.

The unified links and the relationships they describe, once established can be analyzed much like the computationally derived relationships. Such relationships can also be displayed or otherwise reported to a user via a user-interface. The form in which information regarding the display is shared can be varied. For instance, it could be in the form of the exemplary relationship diagram 1300 of FIG. 13. The display can provide a legend 1340 to describe the type of links between the various concepts of interest (e.g., manual, computed, and in-process). Furthermore, the legend 1340 can also illustrate the classification of the computed implicit relationships based on their strengths as High, Medium, or Low, for instance (e.g., as based on the summary matrix 800 of FIG. 8). Such an illustration of relationships can in one comprehensive interface relay information related to a wide web of relationships between concepts, including at least some illustration of strengths of such relationships and whether they were relations that were explicitly defined or were implicit and, thus, derived through computation.

FIG. 16 illustrates an exemplary matrix 1600 for displaying relationships between a plurality of concepts that combine both explicitly defined relationships and implicit relationships derived through computation. The exemplary relationships illustrated in FIG. 16 relate to use-case concepts of a use-case document and individual class specification concepts of a class specification document. Computed links derived by the methods related to traceability engine (e.g., 310 of FIG. 3) are marked with a "C" (e.g., 1610), whereas user-specified manual links are marked with an "M" (e.g., 1620) and the in-process links specified by a modeling tool are marked with a "PR" (e.g., 1630). Furthermore, the strengths of the relationships can be illustrated by marking the cell according to the legend 1640. In case of explicit links, in one exemplary implementation, the strength of explicit links is indicated as High. In a further embodiment, even explicit links may be designated to be of medium or low in strength of relationships.

Exemplary Computing Environment

Figure 17:
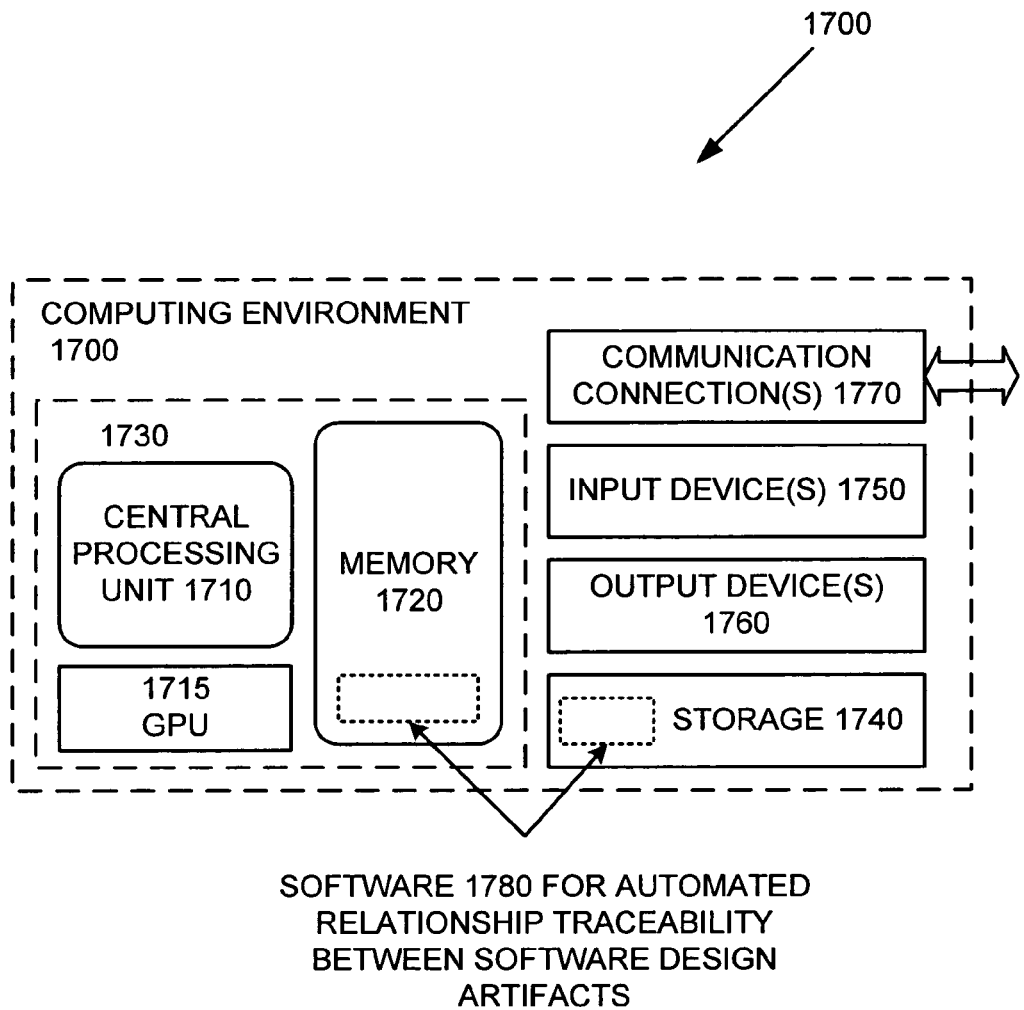
FIG. 17 is a block diagram illustrating an exemplary computing environment for implementing the methods of determining and using traceability relationships between software design artifacts and components thereof.

FIG. 17 illustrates a generalized example of a suitable computing environment 1700 in which described embodiments may be implemented. The computing environment 1700 is not intended to suggest any limitation as to the scope of use or functionality of the invention, as the present invention may be implemented in diverse general-purpose or special-purpose computing environments.

With reference to FIG. 17, the computing environment 1700 includes at least one central processing unit 1710 and memory 1720. In FIG. 17, this most basic configuration 1730 is included within a dashed line. The central processing unit (CPU) 1710 executes computer-executable instructions and may be a real or a virtual processor. In a multi-processing system, multiple processing units execute computer-executable instructions to increase processing power and, as such, the CPU 1710 can be running simultaneously with other processors. The memory 1720 may be volatile memory (e.g., registers, cache, RAM), non-volatile memory (e.g., ROM, EEPROM, flash memory, etc.), or some combination of the two. The memory 1720 stores software 1780 implementing the described methods of automated relationship traceability between software design artifacts.

A computing environment may have additional features. For example, the computing environment 1700 includes storage 1740, one or more input devices 1750, one or more output devices 1760, and one or more communication connections 1770. An interconnection mechanism (not shown) such as a bus, controller, or network that interconnects the components of the computing environment 1700. Typically, operating system software (not shown) provides an operating environment for other software executing in the computing environment 1700, and coordinates activities of the components of the computing environment 1700.

The storage 1740 may be removable or non-removable, and includes magnetic disks, magnetic tapes or cassettes, CD-ROMs, CD-RWs, DVDs, or any other medium which can be used to store information and which can be accessed within the computing environment 1700. For instance, the storage 1740 can store instructions for the software 1780 implementing methods of automated relationship traceability between software design artifacts.

The input device(s) 1750 may be a touch input device such as a keyboard, mouse, pen, or trackball, a voice input device, a scanning device, or another device that provides input to the computing environment 1700. For audio, the input device(s) 1750 may be a sound card or similar device that accepts audio input in analog or digital form, or a CD-ROM reader that provides audio samples to the computing environment. The output device(s) 1760 may be a display, printer, speaker, CD-writer, or another device that provides output from the computing environment 1700.

The communication connection(s) 1770 enable communication over a communication medium to another computing entity. The communication medium conveys information such as computer-executable instructions, compressed graphics information, or other data in a modulated data signal.

Computer-readable media are any available media that can be accessed within a computing environment. By way of example, and not limitation, with the computing environment 1700, computer-readable media include memory 1720, storage 1740, communication media, and combinations of any of the above.

The various tools and systems, such as but not limited to, the traceability engine (e.g., 310 in FIG. 3) and key term comparison engine (e.g., 320) described herein for implementing the methods of automated relationship traceability between software design artifacts are in one aspect a machine comprising a processor (e.g., CPU 1710 of FIG. 17) programmed according to computer executable instructions 1780 stored at least in part in memory 1720 and storage 1740 to execute the functionality represented therein.

Having described and illustrated the principles of our invention with reference to the illustrated embodiments, it will be recognized that the illustrated embodiments can be modified in arrangement and detail without departing from such principles. Elements of the illustrated embodiment shown in software may be implemented in hardware and vice versa. Also, the technologies from any example can be combined with the technologies described in any one or more of the other examples.

In view of the many possible embodiments to which the principles of the invention may be applied, it should be recognized that the illustrated embodiments are examples of the invention and should not be taken as a limitation on the scope of the invention. For instance, various components of systems and tools described herein may be combined in function and use. We therefore claim as our invention all subject matter that comes within the scope and spirit of these claims.

We claim:

1. A computer implemented method for determining relationships between concepts of a plurality of different types of software design artifacts related to a software application design, the method comprising:

receiving data representing a plurality of software design artifacts, wherein the plurality of software design artifacts comprise at least one requirements specification artifact, at least one test plan artifact, at least one use-case artifact, and at least one class specification artifact;

from the data representing the plurality of software design artifacts, extracting at least some concepts correspondingly associated with the plurality of the software design artifacts;

from the at least some extracted concepts, extracting at least some key terms correspondingly associated with the at least some extracted concepts;

determining term significance weights correspondingly associated with the at least some key terms;

at least based on the term significance weights, quantifying relationships between at least some of the extracted concepts of the plurality of the software design artifacts, the quantifying relationships comprising:

generating a matrix of relationship quotients that represent the quantified relationships between at least some of the extracted concepts of the plurality of the software design artifacts;

normalizing value of a relationship quotient with highest value in the matrix to a value of 1 and normalizing values of rest of the relationship quotients proportionally thereto to generate a normalized version of the matrix; and based on the normalized values of the relationship quotients, classifying each relationship into one of the following three categories: High level relationship, Medium level relationship, and Low level relationship; and presenting the quantified relationships to a user via a user interface, including displaying the quantified relationships organized into their associated categories of High level relationship, Medium level relationship, and Low level relationship.

2. The method of claim 1 wherein, the concepts comprise at least one concept selected from a group of concepts consisting of test case concepts, individual use-cases, individual requirements, and individual class descriptions.

3. The method of claim 1 wherein, extracting at least some concepts correspondingly associated with the plurality of the software design artifacts comprises:

applying parsing methods to textual forms of the plurality of the software design artifacts to decompose at least some of the plurality of the software design artifacts into text-based document objects; and based at least in part on different predefined templates corresponding to different concept types, classifying at least some of the text-based document objects as concept descriptions of the different concept types.

4. The method of claim 3 wherein, extracting the at least some key terms correspondingly associated with the at least some extracted concepts comprises:

parsing at least some of the extracted concepts to decompose the concept descriptions into words and phrases;

storing the decomposed words and phrases as key terms in a key terms database;

comparing the decomposed words and phrases to a stop list; and deleting from the key terms database those key terms that correspond to words and phrases also present in the stop list.

5. The method of claim 4 further comprising:

applying stemming methods to the key terms of the key terms database to generate stemmed versions of key terms in the key terms data base; and generating a list of stemmed key terms associated with the at least some of the extracted concepts of the plurality of the software design artifacts.

6. The method of claim 1 wherein, determining term significance weights correspondingly associated with the at least some key terms, comprises:

determining term frequencies of the key terms in the at least some of the concepts; and determining inverse document frequencies of at least some of the key terms.

7. The method of claim 1 wherein, quantifying the relationships between at least some of the extracted concepts of the plurality of the software design artifacts comprises:
conducting a similarity analysis between the at least some of the extracted concepts of the plurality of the software design artifacts based on the at least some of the key terms.

8. The method of claim 7 wherein, the similarity analysis is based on a semantic meaning of the at least some of the key terms wherein the semantic meaning of the at least some of the key terms is determined by applying data from a domain ontology including entity relationships data and entity description data to the at least some of the key terms.

9. The method of claim 7 wherein, the similarity analysis is a Cosine Measure similarity analysis.

10. A computer system for tracing relationships between concepts of a plurality of different types of software design artifacts related to a software application design, the system comprising:
memory; and
a traceability engine comprising at least one processor that is communicative with the memory and, based on instructions stored in the memory, the traceability engine operable to:
receive data representing a plurality of software design artifacts;
from the data representing the plurality of software design artifacts, extract at least some key terms corresponding to concepts associated with the plurality of the software design artifacts, wherein the plurality of software design artifacts comprise at least one requirements specification artifact, at least one test plan artifact, at least one use-case artifact, and at least one class specification artifact;
determine corresponding term significance weights for at least some of the key terms corresponding to the concepts of the plurality of the software design artifacts;
at least based on the term significance weights, quantify the relationships between concepts associated with the plurality of the software design artifacts, the quantifying relationships comprising:
generating a matrix of relationship quotients that represent the quantified relationships between at least some concepts associated with the plurality of the software design artifacts;
normalizing value of a relationship quotient with highest value in the matrix to a value of 1 and normalizing values of rest of the relationship quotients proportionally thereto to generate a normalized version of the matrix; and
based on the normalized values of the relationship quotients, classifying each relationship into one of the following three categories: High level relationship, Medium level relationship, and Low level relationship; and
present, to a user via a user interface, a display of the quantified relationships organized into their associated categories of High level relationship, Medium level relationship, and Low level relationship.

11. The system of claim 10 wherein the traceability engine is further operable to:
establish one or more relationships between at least one of the concepts associated with the quantified relationships and at least one other concept associated with explicitly defined relationships between other concepts of other software design artifacts.

12. The system of claim 10 wherein the traceability engine is further operable to performing an impact analysis based on the quantified relationships.

13. The system of claim 10 further comprising a key terms comparison engine operable to compare sets of key words correspondingly associated with a first selected concept and a second selected concept to generate a subset of key words of the first selected concept not found in the set of key words associated with the second selected concept to generate a missing key terms report.

14. The system of claim 10 wherein to extract at least some key terms corresponding to concepts associated with the plurality of the software design artifacts comprises to determine semantic meanings associated with the at least some of the key terms based at least in part on domain ontology associated with the software design artifacts.

15. A computer readable storage medium useful in connection with a computer which includes a processor and a memory, the computer readable storage medium storing computer executable instructions which are configured to cause the computer to process data related to software design artifacts for quantifying relationships between concepts of a plurality of different types of software design artifacts related to a software application design by performing the method steps of:
receiving data representing a plurality of software design artifacts, wherein the plurality of software design artifacts comprise at least one requirements specification artifact, at least one test plan artifact, at least one use-case artifact, and at least one class specification artifact;
from the data representing the plurality of software design artifacts, extracting at least some concepts correspondingly associated with the plurality of the software design artifacts;
from the at least some extracted concepts, extracting at least some key terms correspondingly associated with the at least some extracted concepts;
determining term significance weights correspondingly associated with the at least some key terms;
at least based on the term significance weights, quantifying the relationships between at least some of the extracted concepts of the plurality of the software design artifacts, the quantifying the relationships comprising:
generating a matrix of relationship quotients that represent the quantified relationships between at least some of the extracted concepts of the plurality of the software design artifacts;
normalizing value of a relationship quotient with highest value in the matrix to a value of 1 and normalizing values of rest of the relationship quotients proportionally thereto to generate a normalized version of the matrix; and
based on the normalized values of the relationship quotients, classifying each relationship into one of the following three categories: High level relationship, Medium level relationship, and Low level relationship; and
presenting the quantified relationships to a user via a user interface, including displaying the quantified relationships organized into their associated categories of High level relationship, Medium level relationship, and Low level relationship.

16. The computer readable storage medium of claim 15 wherein, determining term significance weights correspondingly associated with the at least some key terms, comprises:
   determining term frequencies of the key terms in the at least some of the concepts; and
   determining inverse document frequencies of at least some of the key terms.

17. The computer readable storage medium of claim 15 wherein, quantifying the relationships between at least some of the extracted concepts of the plurality of the software design artifacts comprises:

conducting a similarity analysis between the at least some of the extracted concepts of the plurality of the software design artifacts based on the at least some of the key terms.

18. The computer readable storage medium of claim 15 wherein, the similarity analysis is based at least in part on a s semantic meaning of the at least some of the key terms.

* * * * *

UNITED STATES PATENT AND TRADEMARK OFFICE
CERTIFICATE OF CORRECTION

PATENT NO. : 7,735,068 B2
APPLICATION NO. : 11/292895
DATED : June 8, 2010
INVENTOR(S) : Siddaramappa et al.

It is certified that error appears in the above-identified patent and that said Letters Patent is hereby corrected as shown below:

Title Page, item (57), in the Abstract:

Line 1, "allows" should read --allow--

In the Drawings:

Fig. 4, "OF OF" should read --OF--

Fig. 9, "VICE A VERSA" should read --VICE VERSA--

Fig. 11, "RELATED ONE" should read --RELATED TO ONE--

Fig. 11, "ONE MORE" should read --ONE OR MORE--

Fig. 12B, "AT LEAST PART" should read --AT LEAST IN PART--

Fig. 12B, "ON THE ON THE" should read --ON THE--

In the Specification:

Col. 2, line 12, "but it also" should read --but is also--

Col. 3, line 18, "deign artifacts" should read --design artifacts.--

Col. 4, line 25, "concepts.According" should read --concepts. According--

Col. 4, line 40, "system" should read --systems--

Signed and Sealed this
First Day of March, 2011

David J. Kappos
*Director of the United States Patent and Trademark Office*

CERTIFICATE OF CORRECTION (continued)
U.S. Pat. No. 7,735,068 B2

Col. 4, line 43, "is" should read --are--

Col. 6, line 57, "that been" should read --that have been--

Col. 7, line 10, "domain entity" should read --domain the entity--

Col. 7, line 12, "is a" should read --as a--

Col. 7, line 17, "and so for the which are" should read --and so forth, which are--

Col. 7, line 38, "will be not be" should read --will not be--

Col. 8, line 1, "object etc." should read --object, etc.--

Col. 10, line 24, "affecting" should read --affect--

Col. 10, line 38, "1.1," should read --1.1;--

Col. 10, line 40, "1.1," should read --1.1;--

Col. 11, line 8, "as" should read --is--

Col. 11, line 47, "and 920" should read --and at 920--

Col. 11, line 55, "requirements" should read --requirement--

Col. 12, line 25, "adding key term" should read --adding a key term--

Col. 13, line 16, "application is desirable." should read --application.--

Col. 13, line 60, "add alter" should read --alter--

Col. 13, line 62, "not address" should read --not to address--

Col. 14, line 4, "comprise of the" should read --comprise the--

Col. 14, line 4, "initialed" should read --initialized--

Col. 14, line 12, "evaluated the" should read --evaluated, the--

Col. 14, line 30, "on part" should read --on the part--

Col. 15, line 64, "diagram 1300 of FIG. 13" should read --diagram of FIG. 13--

Col. 15, lines 65 and 67, "1340" should read --1345--

CERTIFICATE OF CORRECTION (continued)
U.S. Pat. No. 7,735,068 B2

Col. 16, line 17, "to traceability" should read --to a traceability--

Col. 16, line 26, "be of medium" should read --be medium--

Col. 16, line 58, "that interconnects" should read --interconnects--

Col. 18, line 59, "data base" should read --database--

Col. 22, line 7, "a s semantic" should read --a semantic--